US012802098B2

(12) United States Patent
Tan

(10) Patent No.: US 12,802,098 B2
(45) Date of Patent: Nov. 17, 2026

(54) DATA PROCESSING METHOD AND RELATED APPARATUS

(71) Applicant: TENCENT TECHNOLOGY (SHENZHEN) COMPANY LIMITED, Shenzhen (CN)

(72) Inventor: Bin Tan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 100 days.

(21) Appl. No.: 18/195,764

(22) Filed: May 10, 2023

(65) Prior Publication Data

US 2023/0281656 A1 Sep. 7, 2023

Related U.S. Application Data

(63) Continuation of application No. PCT/CN2022/117472, filed on Sep. 7, 2022.

(30) Foreign Application Priority Data

Oct. 20, 2021 (CN) ......................... 202111220725.8

(51) Int. Cl.
*G06Q 30/0242* (2023.01)
*G06Q 30/0251* (2023.01)

(52) U.S. Cl.
CPC ..... *G06Q 30/0243* (2013.01); *G06Q 30/0255* (2013.01)

(58) Field of Classification Search
CPC ........... G06Q 30/0243; G06Q 30/0255; G06Q 30/0242
See application file for complete search history.

(56) References Cited

U.S. PATENT DOCUMENTS

2010/0106605 A1* 4/2010 Lin ........................ G06Q 10/08 705/14.73
2016/0037197 A1* 2/2016 Kitts .................. H04N 21/2668 725/35

(Continued)

FOREIGN PATENT DOCUMENTS

CN 110782286 A 2/2020
CN 112446717 A 3/2021
CN 114298728 A 4/2022

OTHER PUBLICATIONS

The World Intellectual Property Organization (WIPO) International Search Report for PCT/CN2022/117472 Nov. 28, 2022 13 Pages (including translation).

*Primary Examiner* — Azam A Ansari
(74) *Attorney, Agent, or Firm* — ANOVA LAW GROUP, PLLC

(57) ABSTRACT

A data processing method includes: obtaining an advertisement state of each candidate advertisement corresponding to a current exposure request and an overall state of an advertising platform in response to the current exposure request; determining, by a classification network in a scoring model, probability of each candidate advertisement belonging to different reference advertisement types; determining, by a scoring network in the scoring model, a competition score of the candidate advertisement for the current exposure request according to the advertisement state corresponding to the candidate advertisement and the overall state based on the probability of the candidate advertisement belonging to different reference advertisement types, the scoring model including multiple scoring networks corresponding to different reference advertisement types; and determining a target advertisement exposed by the current exposure request according to the competition score of each candidate advertisement for the current exposure request.

20 Claims, 14 Drawing Sheets

(56) References Cited

U.S. PATENT DOCUMENTS

| | | | | |
|---|---|---|---|---|
| 2016/0275554 | A1* | 9/2016 | Yan | G06Q 30/0255 |
| 2021/0110428 | A1* | 4/2021 | Lu | G06N 20/00 |
| 2023/0004833 | A1* | 1/2023 | Sahasi | G06N 5/04 |

* cited by examiner

DATA PROCESSING METHOD AND RELATED APPARATUS

RELATED APPLICATION(S)

This application is a continuation application of PCT Patent Application No. PCT/CN2022/117472 filed on Sep. 7, 2022, which claims priority to Chinese Patent Application No. 202111220725.8, filed with the Chinese Patent Office on Oct. 20, 2021 and entitled "DATA PROCESSING METHOD AND RELATED APPARATUS", all of which are incorporated herein by reference in entirety.

FIELD OF THE TECHNOLOGY

The present disclosure relates to the field of advertising, and in particular, to a data processing method and a related apparatus.

BACKGROUND

In practical implementations, when an advertiser places an advertisement on an advertising platform, a targeting condition is set for the placed advertisement. For example, an exposure object of the advertisement is set as a male under 30 years old in Shanghai, or the like. When the advertising platform detects that an exposure request arrives, advertisements with the targeting conditions matching the exposure request will be recalled, and the recalled advertisements are coarsely ranked, finely ranked, or filtered to obtain a candidate advertisement queue corresponding to the exposure request. Further, the advertisements in the candidate advertisement queue are scored, and the advertisements to be exposed by the current exposure request are determined according to the score of each advertisement in the candidate advertisement queue.

In certain existing technology, the advertisements in the candidate advertisement queue are generally scored using a model trained based on a reinforcement learning algorithm.

However, the model is generally difficult to score each advertisement. The reason is that rich and various advertisements are placed on the advertising platform. In order to adapt to this characteristic of the advertising platform, when training a model for scoring advertisements, the model is generally used to score a large number of different types of advertisements, which will make the model have a huge action space. The huge action space will cause the trained model to be difficult to converge. That is, the performance of the model cannot meet the expected desirables. Accordingly, in practical implementations, it is often difficult to generate a desired income for the advertising platform by determining a final exposure advertisement according to the score configured for the advertisement by the model.

SUMMARY

A first aspect of the present disclosure provides a data processing method. The method is performed by a computing device. The method includes:

obtaining an advertisement state of each candidate advertisement corresponding to a current exposure request, the advertisement state representing a competition condition in response to that the candidate advertisement competes for the current exposure request, and obtaining an overall state of an advertising platform in response to the current exposure request, the overall state representing a current exposure task performance situation of the advertising platform;

determining, by a classification network in a scoring model, probability of each candidate advertisement belonging to different reference advertisement types;

determining, by a scoring network in the scoring model, a competition score of each candidate advertisement for the current exposure request according to the advertisement state corresponding to the candidate advertisement and the overall state based on the probability of the candidate advertisement belonging to different reference advertisement types, the scoring model including multiple scoring networks corresponding to different reference advertisement types; and determining a target advertisement exposed by the current exposure request according to the competition score of each candidate advertisement for the current exposure request.

A second aspect of the present disclosure provides a data processing apparatus. The apparatus is deployed on a computing device. The apparatus includes: a memory storing computer program instructions; and a processor coupled to the memory and configured to execute the computer program instructions and perform: obtaining an advertisement state of each candidate advertisement corresponding to a current exposure request, the advertisement state representing a competition condition in response to that the candidate advertisement competes for the current exposure request, and obtaining an overall state of an advertising platform in response to the current exposure request, the overall state representing a current exposure task performance situation of the advertising platform; determining, by a classification network in a scoring model, probability of each candidate advertisement belonging to different reference advertisement types; determining, by a scoring network in the scoring model, a competition score of each candidate advertisement for the current exposure request according to the advertisement state corresponding to the candidate advertisement and the overall state based on the probability of the candidate advertisement belonging to different reference advertisement types, the scoring model comprising multiple scoring networks corresponding to different reference advertisement types; and determining a target advertisement exposed by the current exposure request according to the competition score of each candidate advertisement for the current exposure request.

A third aspect of the present disclosure provides a non-transitory computer-readable storage medium storing computer program instructions executable by at least one processor to perform: obtaining an advertisement state of each candidate advertisement corresponding to a current exposure request, the advertisement state representing a competition condition in response to that the candidate advertisement competes for the current exposure request, and obtaining an overall state of an advertising platform in response to the current exposure request, the overall state representing a current exposure task performance situation of the advertising platform; determining, by a classification network in a scoring model, probability of each candidate advertisement belonging to different reference advertisement types; determining, by a scoring network in the scoring model, a competition score of each candidate advertisement for the current exposure request according to the advertisement state corresponding to the candidate advertisement and the overall state based on the probability of the candidate advertisement belonging to different reference advertisement types, the scoring model comprising multiple scoring networks corresponding to different reference advertisement types; and determining a target advertisement exposed by the current exposure request according to the competition score of each candidate advertisement for the current exposure request.

Other aspects of the present disclosure may be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
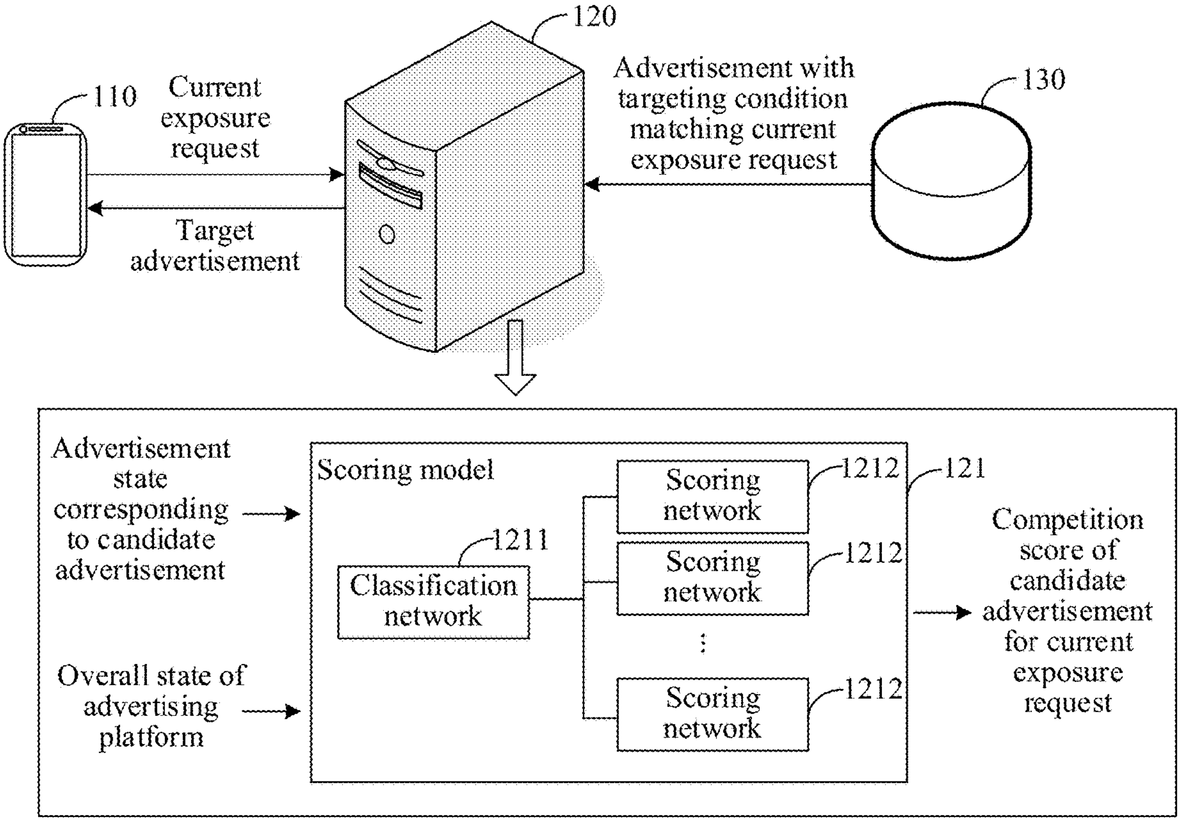
FIG. 1 is a schematic diagram of an implementation scenario of a data processing method according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of embodiments. When and as applicable, the term "an embodiment," "one embodiment," "some embodiment(s), "some embodiments," "certain embodiment(s)," or "certain embodiments" may refer to the same subset or different subsets of embodiments, and may be combined with each other without conflict.

In certain embodiments, the term "based on" is employed herein interchangeably with the term "according to."

In certain existing technology, when a reinforcement learning algorithm is adopted to train a scoring model for scoring candidate advertisements, in order to enable the scoring model to score various advertisements, all advertisements with targeting conditions meeting a certain exposure request are generally considered to be training candidate advertisements corresponding to the exposure request. Furthermore, a scoring model to be trained is configured to determine scores corresponding to the respective training candidate advertisements, and selecting an advertisement exposed by the exposure request therefrom based on the scores corresponding to the respective training candidate advertisements. However, there are generally tens of thousands of advertisements with the targeting conditions meeting the exposure request. Scores are configured for tens of thousands of advertisements, and a finally exposed advertisement is selected therefrom, whereby the scoring model to be trained has a huge action space, and the huge action space will often make the scoring model difficult to converge, thereby causing poor performance of the scoring model obtained by final training and difficulty in configuring scores for various advertisements.

In order to solve the technical problems of certain existing technology, an embodiment of the present disclosure provides a data processing method.

In the data processing method, an advertisement state corresponding to each candidate advertisement corresponding to a current exposure request is first obtained. The advertisement state represents a competition condition in response to that the candidate advertisement corresponding thereto competes for the current exposure request, and an overall state of an advertising platform in response to the current exposure request is obtained. The overall state represents a current exposure task performance situation of the advertising platform. In certain embodiment(s), a classification network in a scoring model determines probability of each candidate advertisement belonging to different reference advertisement types. Furthermore, a scoring network in the scoring model determines a competition score of the candidate advertisement for the current exposure request according to the advertisement state corresponding to the candidate advertisement and the overall state of the advertising platform based on the probability of the candidate advertisement belonging to different reference advertisement types. The scoring model includes multiple scoring networks corresponding to the various reference advertisement types. Finally, a target advertisement exposed by the current exposure request is determined according to the competition score of each candidate advertisement for the current exposure request.

The data processing method uses a scoring model including multiple scoring networks to score candidate advertisements corresponding to a current exposure request, and the multiple scoring networks in the scoring model are respectively adapted to score advertisements of different reference advertisement types. Different scoring networks in the scoring model are suitable for scoring the advertisements of different reference advertisement types. Therefore, when training the scoring model, each scoring network may be trained by using applicable advertisements of reference advertisement types, whereby the action space of each scoring network is not too large, and the scoring network converges more easily in a smaller action space. That is to say, it is easier to enable the trained scoring network to have better performance. Accordingly, the scoring model including each of the scoring networks may also have a higher performance, and a score corresponding to each candidate advertisement can be determined. An advertisement finally exposed by an advertising platform is selected based on a score configured for the advertisement by the scoring model, which also helps the advertising platform to obtain a higher income.

It is to be understood that the data processing method according to this embodiment of the present disclosure may be applied to a computing device having a data processing capability. The computing device may be a terminal device or a server. The terminal device may be a computer, a smartphone, a tablet computer, a personal digital assistant (PDA), or the like. The server may be an application server or a Web server. In actual deployment, the server may be an independent server, or may be a cluster server composed of multiple physical servers or a cloud server.

In order to facilitate understanding of the data processing method according to this embodiment of the present disclosure, an implementation scenario of the data processing method is exemplarily described below with an example in which the server performs the data processing method.

Reference is made to FIG. 1. FIG. 1 is a schematic diagram of an implementation scenario of a data processing method according to an embodiment of the present disclosure. As shown in FIG. 1, the implementation scenario includes a terminal device 110, a server 120, and a database 130. The terminal device 110 and the server 120 may communicate with each other via a network. The server 120 and the database 130 may also communicate via the network, or the database 130 may be integrated into the server 120.

In this embodiment of the present disclosure, the terminal device 110 is user-oriented for displaying exposed advertisements through a specific interface or window. The server 120 may be a background server of an advertising platform for performing the data processing method according to this embodiment of the present disclosure, and feeding back, in response to an exposure request generated by the terminal device 110, a target advertisement exposed through the exposure request to the terminal device 110. The database 130 is configured to store an advertisement placed on the advertising platform by an advertiser and a playing control parameter corresponding to the advertisement.

In practical implementations, after the terminal device 110 detects that a user triggers an operation of opening an advertisement playing interface or an advertisement playing window, the detected current exposure request may be transmitted to the server 120 via the network. For example, assuming that the terminal device 110 detects that the user triggers an operation of opening a certain video application and an open screen interface of the video application supports advertisement exposure, the terminal device 110 may transmit a current exposure request to the server 120. The current exposure request may carry a targeting attribute corresponding thereto, such as a personal attribute of the user.

After receiving the current exposure request transmitted by the terminal device 110, the server 120 may recall, from the database 130, an advertisement matching a corresponding targeting condition and the targeting attribute corresponding to the current exposure request according to the targeting attribute corresponding to the current exposure request. For example, assuming that the targeting attribute corresponding to the current exposure request represents that the user is a male under 30 years old in Shanghai, the server 120 may recall, from database 130, advertisements matching the targeting condition "Male under 30 years old in Shanghai". Furthermore, the server 120 may perform a series of filtering processes, such as coarse ranking and fine ranking, on the recalled advertisement, so as to obtain each candidate advertisement corresponding to the current exposure request.

The server 120 may obtain an advertisement state corresponding to each candidate advertisement corresponding to a current exposure request. The advertisement state herein represents a competition condition in response to that the candidate advertisement corresponding thereto competes for the current exposure request. Exemplarily, when the candidate advertisement is a contract advertisement, the server 120 may determine a competition environment of the contract advertisement according to advertisement features of other advertisements in each candidate advertisement except the contract advertisement. The server 120 may also obtain, from the database 130, at least one piece of information: a playing amount, a shortage, a predetermined playing amount, a selling price, a playing control parameter, and a targeting condition of the contract advertisement. Furthermore, the competition environment of the contract advertisement and the information related to the contract advertisement obtained from the database 130 are spliced together to obtain an advertisement state corresponding to the contract advertisement. When the candidate advertisement is a bid advertisement, the server 120 may determine a competition environment of the bid advertisement according to advertisement features of other advertisements in each candidate advertisement except the bid advertisement. Furthermore, the competition environment of the bid advertisement is taken as an advertisement state corresponding to the bid advertisement.

In addition, the server 120 also may obtain an overall state of an advertising platform. The overall state represents a current exposure task performance situation of the advertising platform. Exemplarily, the server 120 may obtain the current overall advertisement shortage, advertisement excess, revenue, etc. as the overall state of the advertising platform.

Furthermore, the server 120 determines a competition score of each candidate advertisement corresponding to the current exposure request for the current exposure request by using a pre-trained scoring model. In certain embodiment(s), a classification network 1211 in a scoring model 121 may determine probability of each candidate advertisement belonging to different reference advertisement types. In certain embodiment(s), a scoring network 1212 in the scoring model 121 determines a competition score of the candidate advertisement for the current exposure request according to the advertisement state corresponding to the candidate advertisement and the overall state of the advertising platform based on the probability of the candidate advertisement belonging to different reference advertisement types.

The scoring model 121 includes multiple scoring networks 1212, and the multiple scoring networks 1212 are respectively adapted to score advertisements of different reference advertisement types. Each scoring network 1212 in the scoring model 121 may be trained by using advertisements of the reference advertisement type to which the scoring network 1212 is applied, whereby the action space of each scoring network 1212 is not too large.

Finally, the server 120 may determine a target advertisement exposed by the current exposure request according to the competition score of each candidate advertisement determined by the scoring model 121 for the current exposure request, and the target advertisement is transmitted to the terminal device 110 via the network, whereby the terminal device 110 plays the target advertisement in a corresponding advertisement playing interface or advertisement playing window.

It is to be understood that the implementation scenario shown in FIG. 1 is only an example. In practical implementations, the data processing method according to this embodiment of the present disclosure may also be applied to other scenarios, and there is no limitation on the implementation scenario to which the data processing method according to this embodiment of the present disclosure is applied.

The data processing method provided in the present disclosure is described in detail below through a method embodiment.

Figure 2:
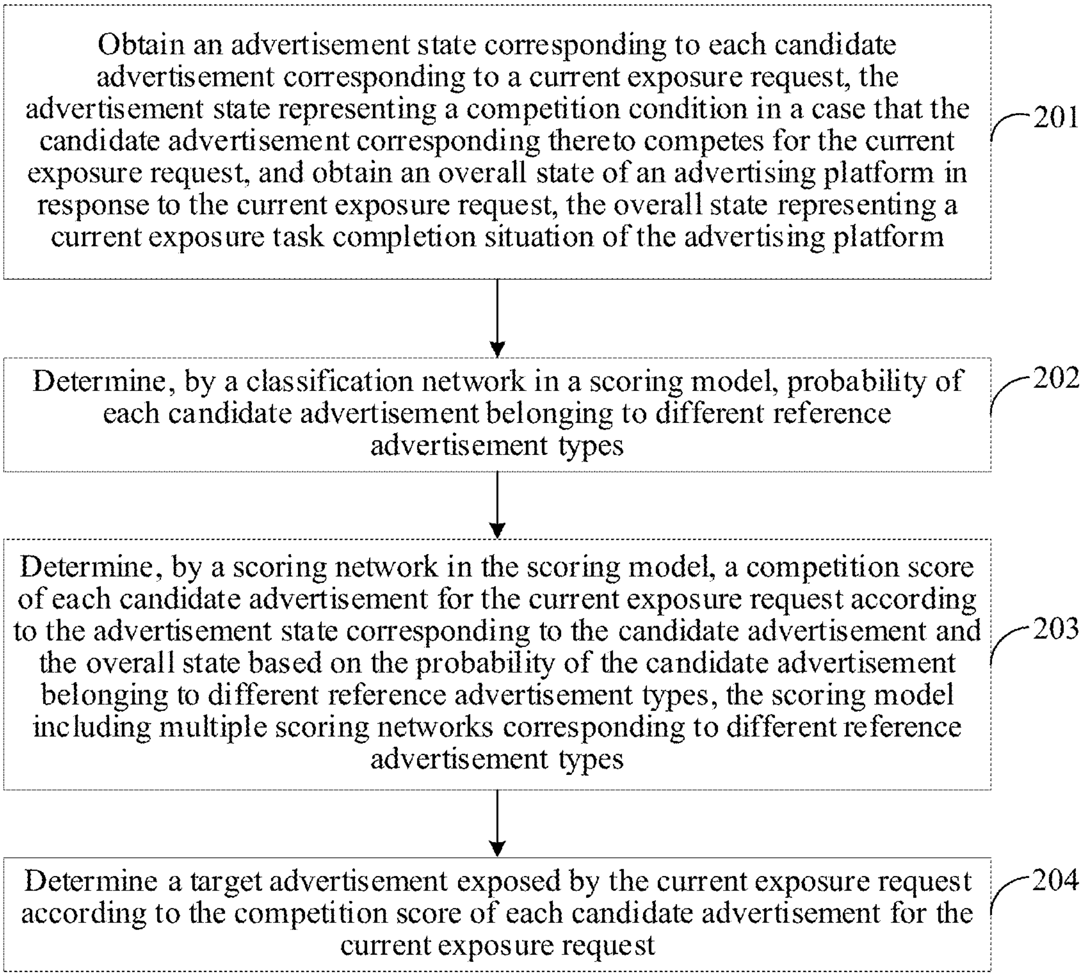
FIG. 2 is a schematic flowchart of a data processing method according to certain embodiment(s) of the present disclosure.

Reference is made to FIG. 2. FIG. 2 is a schematic flowchart of a data processing method according to an embodiment of the present disclosure. For ease of description, the following embodiment will still be described with an example in which the server performs the data processing method. As shown in FIG. 2, the data processing method includes the following steps:

Step 201: Obtain an advertisement state corresponding to each candidate advertisement corresponding to a current exposure request, the advertisement state representing a competition condition in response to that the candidate advertisement corresponding thereto competes for the current exposure request, and obtain an overall state of an advertising platform in response to the current exposure request, the overall state representing a current exposure task performance situation of the advertising platform.

In this embodiment of the present disclosure, after detecting the arrival of a current exposure request, the server may determine candidate advertisements corresponding to the current exposure request, and obtain an advertisement state corresponding to each candidate advertisement. In addition, the server may obtain an overall state of an advertising platform in response to the current exposure request.

In certain embodiment(s), the server may determine candidate advertisements corresponding to the current exposure request by: directly determining each advertisement with a corresponding targeting condition on the advertising platform matching a targeting attribute of the current exposure request as a candidate advertisement corresponding to the current exposure request; or, recalling each advertisement with the corresponding targeting condition on the advertising platform matching the targeting attribute of the current exposure request, and coarsely ranking the recalled advertisements, and taking advertisements retained after the coarse ranking as candidate advertisements corresponding to the current exposure request; or, recalling each advertisement with the corresponding targeting condition on the advertising platform matching the targeting attribute of the current exposure request, and coarsely ranking and finely ranking the recalled advertisements, and taking advertisements retained after the fine ranking as candidate advertisements corresponding to the current exposure request.

It is to be understood that, in order to alleviate the operating pressure of the server in scoring candidate advertisements, it is generally preferable to select the advertisements retained after the fine ranking as the candidate advertisements corresponding to the current exposure request. In certain embodiment(s), in practical implementations, the server may also determine candidate advertisements corresponding to the target exposure in other manners. The present disclosure is not limited herein.

In this embodiment of the present disclosure, when the server determines a competition score of the candidate advertisement for the current exposure request through a scoring model, at least two types of data may be used, which are an advertisement state corresponding to the candidate advertisement and an overall state of the advertising platform. The advertisement state corresponding to the candidate advertisement represents a competition condition in response to that the candidate advertisement competes for the current exposure request. For example, the advertisement state may represent a competition environment where the corresponding candidate advertisement competes for the current exposure request. For another example, the advertisement state may be determined according to a playing control parameter of the corresponding candidate advertisement. The playing control parameter can reflect the competitiveness of the candidate advertisement to some extent. The overall state of the advertising platform represents a current exposure task performance situation of the advertising platform. For example, the overall state of the advertising platform may include a the current overall advertisement shortage (namely, a playing amount obtained by a minimum desired playing amount thereof in a current period minus a current playing amount of the advertisement), advertisement excess (namely, a playing amount obtained by a current playing amount of the advertisement minus a maximum desired playing amount thereof in a current period), revenue (namely, a revenue generated by playing the advertisement currently), and the like of advertising platform.

In certain embodiment(s), the candidate advertisement corresponding to the current exposure request may include at least one of a contract advertisement and a bid advertisement. The contract advertisement is an advertisement generated in the following manners. An advertiser signs a contract with the advertising platform, and requests the advertising platform to play an advertisement of a predetermined playing amount to a user of a specified type of the advertiser within a specified time. If the contract is reached, the advertiser may pay a corresponding advertising fee to the advertising platform. If the contract is not reached, namely, an actual playing amount of the advertisement does not reach a predetermined playing amount corresponding thereto, the advertising platform may pay a certain fee to the advertiser. When playing such a contract advertisement, if the actual playing amount of the advertisement exceeds the predetermined playing amount corresponding thereto, the advertising platform will not charge an additional fee. The bid advertisement is a form of advertisement paid according to an advertisement effect (such as a click-through rate or a conversion rate). The advertiser may offer a bid for the placed advertisement. When an exposure request arrives, bid advertisements with corresponding targeting conditions matching the exposure request may compete for the exposure request based on the pre-offered bid by the advertiser.

Under normal circumstances, each candidate advertisement corresponding to the current exposure request may include a contract advertisement and a bid advertisement at the same time. That is, this embodiment of the present disclosure is applied in a mixed scenario of the contract advertisement and the bid advertisement. At this moment, it is desirable to determine advertisement states corresponding to the contract advertisement and the bid advertisement in a corresponding manner.

As an example, the advertisement state corresponding to the contract advertisement may include a competition environment in response to that the contract advertisement competes for the current exposure request. The competition environment may be determined according to advertisement features of other advertisements in the candidate advertisement except the contract advertisement. For example, the advertisement features of other advertisements in each candidate advertisement corresponding to the current exposure request except the contract advertisement may be spliced together to obtain the competition environment of the contract advertisement.

In addition, the advertisement state corresponding to the contract advertisement may further include at least one of the following information: a playing amount, a shortage, a predetermined playing amount, a selling price, a playing control parameter, and a targeting condition of the contract advertisement. The playing amount is a current playing amount of the contract advertisement. The shortage is a playing amount obtained by a minimum desired playing amount of the contract advertisement in a current period minus the current playing amount of the contract advertisement. The predetermined playing amount is a set playing amount to be achieved by the contract advertisement when the advertiser places the contract advertisement. The selling price is an advertising price negotiated with the advertising platform when the advertiser places the contract advertisement. The playing control parameter may include, for example, Rate and Theta corresponding to the contract advertisement. Rate is a parameter for controlling the playing of the contract advertisement. Rate=0.5 represents that the contract advertisement enters a candidate advertisement queue with a probability of 50%. Theta is another parameter for controlling the playing of the contract advertisement, which is only used in the internal sorting of contract advertisements. For example, contract advertisement A and contract advertisement B have matched the same exposure request. Theta of contract advertisement A is 0.3, and Theta of contract advertisement B is 0.6. In certain embodiment(s), a playing probability of contract advertisement A is 30%, and a playing probability of contract advertisement B is 60%. Theta is essentially a ratio of the predetermined playing amount of the contract advertisement to a current inventory amount of the contract advertisement. The targeting condition is a condition to be satisfied by the exposure request capable of playing the contract advertisement.

In this embodiment of the present disclosure, the competition environment of the contract advertisement and at least one piece of information related to the contract advertisement may be spliced together to obtain the advertisement state corresponding to the contract advertisement.

As an example, the advertisement state corresponding to the bid advertisement may include a competition environment in response to that the bid advertisement competes for the current exposure request. The competition environment may be determined according to advertisement features of other advertisements in the candidate advertisement except the bid advertisement. For example, the advertisement features of other advertisements in the candidate advertisement corresponding to the current exposure request except the bid advertisement may be spliced together to obtain the competition environment of the bid advertisement.

In this embodiment of the present disclosure, the competition environment of the bid advertisement may be directly taken as the advertisement state corresponding to the bid advertisement. Or, at least one piece of information related to the bid advertisement may also be obtained, such as a current revenue of the bid advertisement and the targeting condition. The competition environment of the bid advertisement and the obtained at least one piece of information related to the bid advertisement may be spliced together to obtain the advertisement state corresponding to the bid advertisement.

It is to be understood that in this embodiment of the present disclosure, the candidate advertisement corresponding to the current exposure request may also include other types of advertisements, and the advertisement state corresponding to the candidate advertisement may be determined according to other information related to the candidate advertisement. The present disclosure is not limited in any way herein.

Step 202: Determine, by a classification network in a scoring model, probability of each candidate advertisement belonging to different reference advertisement types.

The server may determine probability of each candidate advertisement belonging to different reference advertisement types by using a classification network in a pre-trained scoring model.

In this embodiment of the present disclosure, an advertisement may be divided into several reference advertisement types according to practical implementation desirables. For example, the reference advertisement types may be divided according to whether the advertisement is in shortage, the reference advertisement types may also be divided according to a user viewing frequency corresponding to the advertisement, etc. The reference advertisement type is not limited in any way by this embodiment herein.

In certain embodiment(s), the server may determine, according to an advertisement state corresponding to a candidate advertisement and the overall state of the advertising platform, probability of the candidate advertisement belonging to different reference advertisement types by the classification network.

Figure 3:
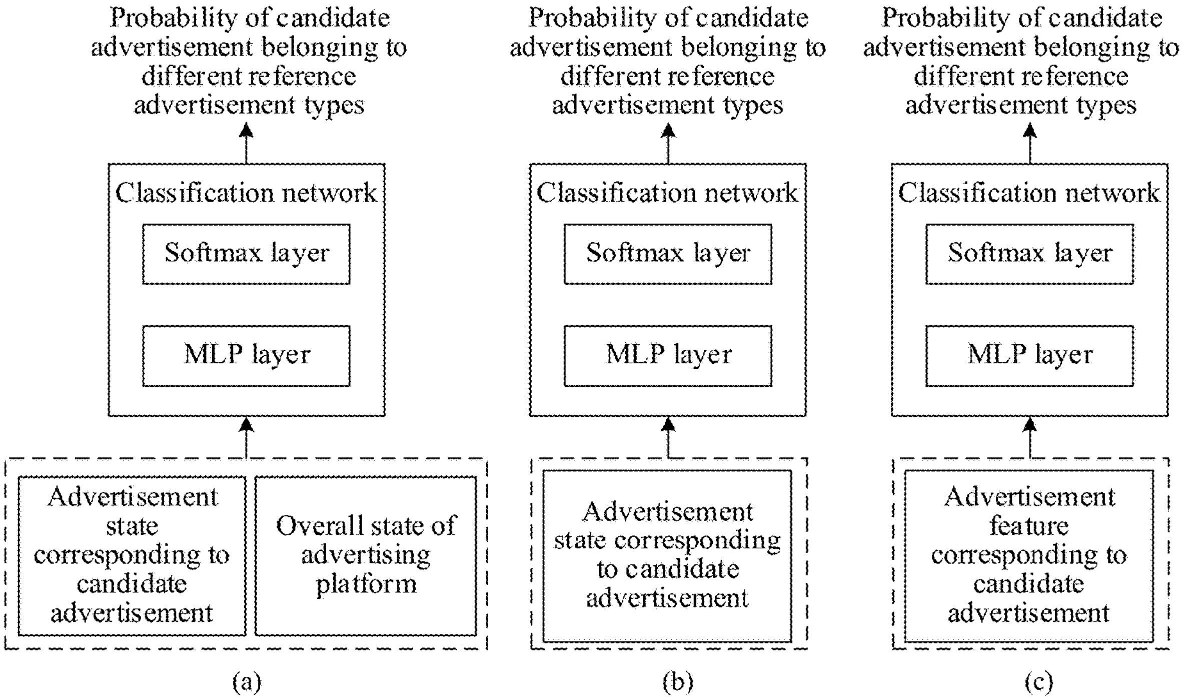
FIG. 3 is a working principle of a classification network according to certain embodiment(s) of the present disclosure.

Exemplarily, FIG. 3(*a*) shows a working principle of the classification network in such an implementation. As shown in FIG. 3(*a*), the server may splice the advertisement state corresponding to the candidate advertisement with the overall state of the advertising platform. In certain embodiment(s), a tensor is obtained by processing the spliced state by a multilayer perceptron (MLP) layer in the classification network. Further, classification processing may be performed based on the tensor by a classification (Softmax) layer in the classification network, and a probability vector may be outputted. The probability vector represents probability of the candidate advertisement belonging to different reference advertisement types. It is assumed that there are four reference advertisement types in total, and a probability vector [0.6, 0.1, 0.2, 0.1] outputted by the classification network indicates that the candidate advertisement has a probability of 60% belonging to a first reference advertisement type, a probability of 10% belonging to a second reference advertisement type, a probability of 20% belonging to a third reference advertisement type, and a probability of 10% belonging to a fourth reference advertisement type.

In certain embodiment(s), the server may determine, according to an advertisement state corresponding to a candidate advertisement, probability of the candidate advertisement belonging to different reference advertisement types by the classification network.

Exemplarily, FIG. 3(*b*) shows a working principle of the classification network in such an implementation. As shown in FIG. 3(*b*), the server may process the advertisement state corresponding to the candidate advertisement by the MLP layer in the classification network to obtain a tensor. In certain embodiment(s), classification processing may be performed based on the tensor by the Softmax layer in the classification network, and a probability vector may be outputted. The probability vector represents probability of the candidate advertisement belonging to different reference advertisement types.

In certain embodiment(s), the server may determine, according to an advertisement feature corresponding to a candidate advertisement, probability of the candidate advertisement belonging to different reference advertisement types by the classification network.

Exemplarily, FIG. 3(*c*) shows a working principle of the classification network in such an implementation. As shown in FIG. 3(*c*), the server may process the advertisement feature corresponding to the candidate advertisement by the MLP layer in the classification network to obtain a tensor. The advertisement feature herein may be determined according to an advertisement content of the candidate advertisement, and may also be determined according to a relevant playing parameter (such as a playing amount, a predetermined playing amount, a playing excess, a shortage, or a revenue) of the candidate advertisement. In certain embodiment(s), classification processing may be performed based on the tensor by the Softmax layer in the classification network, and a probability vector may be outputted. The probability vector represents probability of the candidate advertisement belonging to different reference advertisement types.

It is to be understood that the three working modes of the classification network are merely examples. In practical implementations, other working modes may also be set for the classification network according to practical desirables. The present disclosure is not limited in any way herein.

In practical implementations, the classification network may also be referred to as a gate, which essentially corresponds to an attention layer for controlling a feature processed by the scoring network in the scoring model.

Step 203: Determine, by a scoring network in the scoring model, a competition score of each candidate advertisement for the current exposure request according to the advertisement state corresponding to the candidate advertisement and the overall state based on the probability of the candidate advertisement belonging to different reference advertisement types, the scoring model including multiple scoring networks corresponding to different reference advertisement types.

After determining the probability of the candidate advertisement belonging to different reference advertisement types by the classification network in the scoring model, a competition score of the candidate advertisement for the current exposure request may be determined by the scoring network in the scoring model according to the advertisement state corresponding to the candidate advertisement and the overall state of the advertising platform based on the probability of the candidate advertisement belonging to different reference advertisement types.

The scoring model provided by this embodiment of the present disclosure includes multiple scoring networks (also referred to as expert networks), and the multiple scoring networks have a one-to-one relationship with various reference advertisement types. For example, assuming that there are four reference advertisement types in total, the scoring model includes four scoring networks. Each scoring network is adapted to score advertisements belonging to the corresponding reference advertisement type. For example, assuming that a first scoring network is adapted to score advertisements of a first reference advertisement type, a score configured by the first scoring network for the advertisements belonging to the first reference advertisement type is more accurate than scores configured by other scoring networks for the advertisement. The scoring model provided by this embodiment of the present disclosure is trained based on a reinforcement learning mechanism, and the mode of training the scoring model will be described below in detail through another method embodiment.

In certain embodiment(s), if there are too many scoring networks in the scoring model, each scoring network is difficult to be fully trained due to insufficient training samples of the scoring network, and also, the classification network in the scoring model will output a probability vector with too large dimension. If there are too few scoring networks in the scoring model, the action space of each scoring network is still large, similar to a single network structure in certain existing technology. Based on this, it is desirable to set an appropriate number of scoring networks in the scoring model. In general, good effects can be achieved by setting four to eight scoring networks in the scoring model. In certain embodiment(s), the number of scoring networks included in the scoring model is not limited in any way by the present disclosure herein.

In certain embodiment(s), the server may determine, by the scoring network in the scoring model, a competition score of the candidate advertisement for the current exposure request by: determining, according to an advertisement state corresponding to a candidate advertisement and the overall state of the advertising platform, an input feature of the candidate advertisement; performing, based on probability of the candidate advertisement belonging to different reference advertisement types, weighted processing on the input feature of the candidate advertisement to obtain an input feature of the candidate advertisement under each reference advertisement type; and configuring a competition score for the candidate advertisement by each scoring network in the scoring model according to the input feature of the candidate advertisement under the reference advertisement type corresponding to the scoring network. Furthermore, a competition score of the candidate advertisement for the current exposure request is determined according to the competition score configured for the candidate advertisement by each scoring network in the scoring model.

Figure 4:
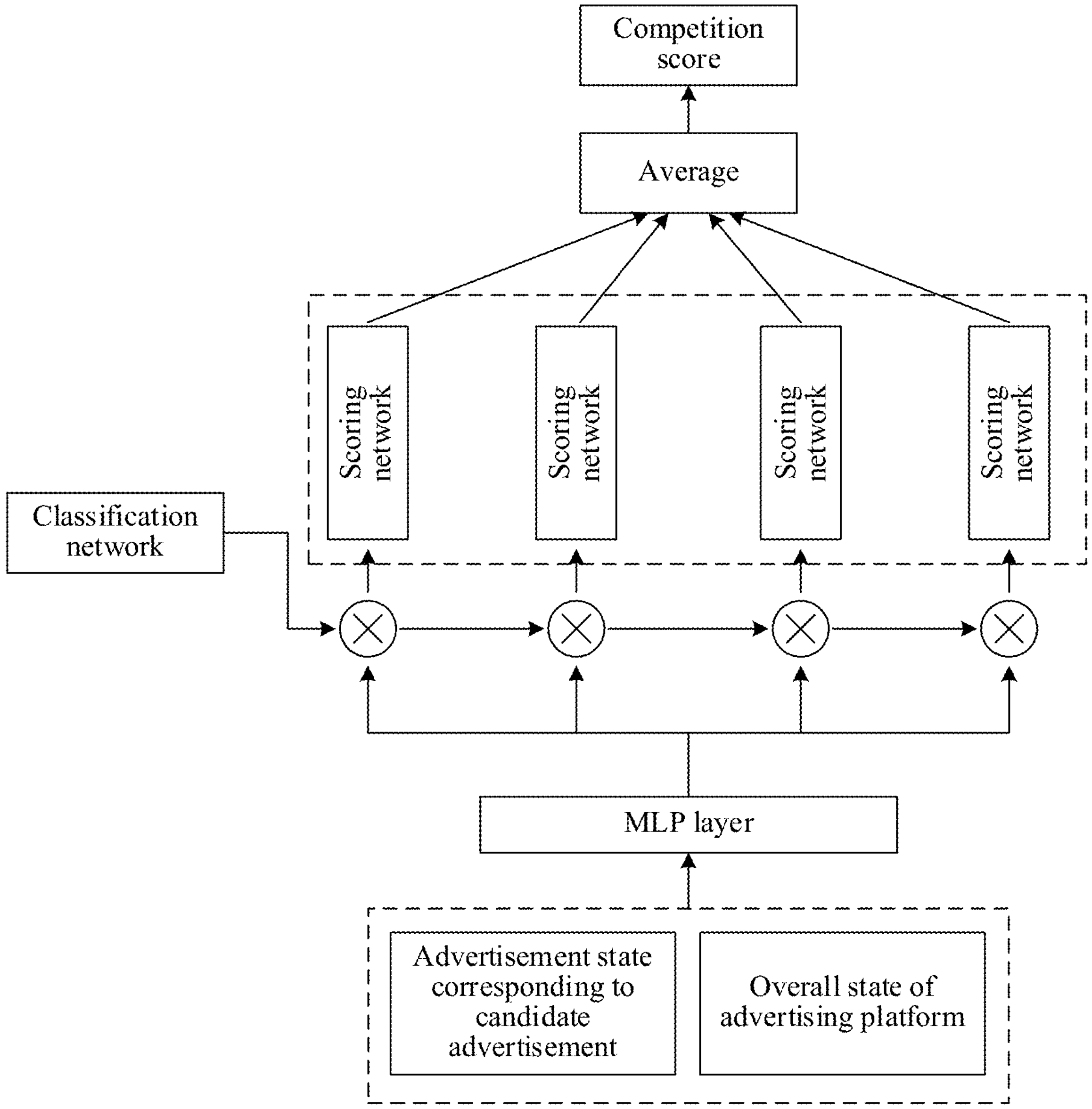
FIG. 4 is a schematic implementation diagram of a scoring mode of a scoring model according to certain embodiment(s) of the present disclosure.

Exemplarily, FIG. 4 shows an implementation process of this scoring mode of the scoring model. As shown in FIG. 4, the server may splice the advertisement state corresponding to the candidate advertisement with the overall state of the advertising platform. In certain embodiment(s), the spliced state is processed by the MLP layer in the scoring model to obtain a Tensor as the input feature of the candidate advertisement. In certain embodiment(s), the scoring model may perform, based on probability of the candidate advertisement belonging to different reference advertisement types, weighted processing on the input feature to obtain an input feature of the candidate advertisement under each reference advertisement type. For example, it is assumed that there are four reference advertisement types in total, and probability of a candidate advertisement belonging to the four reference advertisement types are 0.6, 0.1, 0.2, and 0.1. The scoring model may multiply 0.6 on the basis of an input feature of the candidate advertisement to obtain an input feature of the candidate advertisement under the first reference advertisement type, multiply 0.1 on the basis of the input feature of the candidate advertisement to obtain an input feature of the candidate advertisement under the second reference advertisement type, multiply 0.2 on the basis of the input feature of the candidate advertisement to obtain an input feature of the candidate advertisement under the third reference advertisement type, and multiply 0.1 on the basis of the input feature of the candidate advertisement to obtain an input feature of the candidate advertisement under the fourth reference advertisement type. Furthermore, each scoring network in the scoring model may configure a competition score for the candidate advertisement according to the input feature of the candidate advertisement under the reference advertisement type corresponding to the scoring network. For example, a scoring network of the first reference advertisement type in the scoring model may configure a competition score for the candidate advertisement according to the input feature of the candidate advertisement under the first reference advertisement type, and a scoring network of the second reference advertisement type in the scoring model may configure a competition score for the candidate advertisement according to the input feature of the candidate advertisement under the second reference advertisement type, and so on. Finally, the competition scores configured for the candidate advertisement by each of the scoring networks in the scoring model may be averaged to obtain a competition score of the candidate advertisement for the current exposure request.

In this way, all the scoring networks in the scoring model are enabled to determine the competition score of the candidate advertisement for the current exposure request based on the input features of different weights of the candidate advertisement, whereby the accuracy of the determined competition score can be enhanced.

In certain embodiment(s), the server may determine, by the scoring network in the scoring model, a competition score of the candidate advertisement for the current exposure request by: determining, according to an advertisement state corresponding to a candidate advertisement and the overall state of the advertising platform, an input feature of the candidate advertisement; configuring a competition score for the candidate advertisement by each scoring network in the scoring model according to the input feature of the candidate advertisement; furthermore, performing weighted summation processing on the competition score configured for the candidate advertisement by each of the scoring networks based on the probability of the candidate advertisement belonging to different reference advertisement types, to obtain a competition score of the candidate advertisement for the current exposure request.

Figure 5:
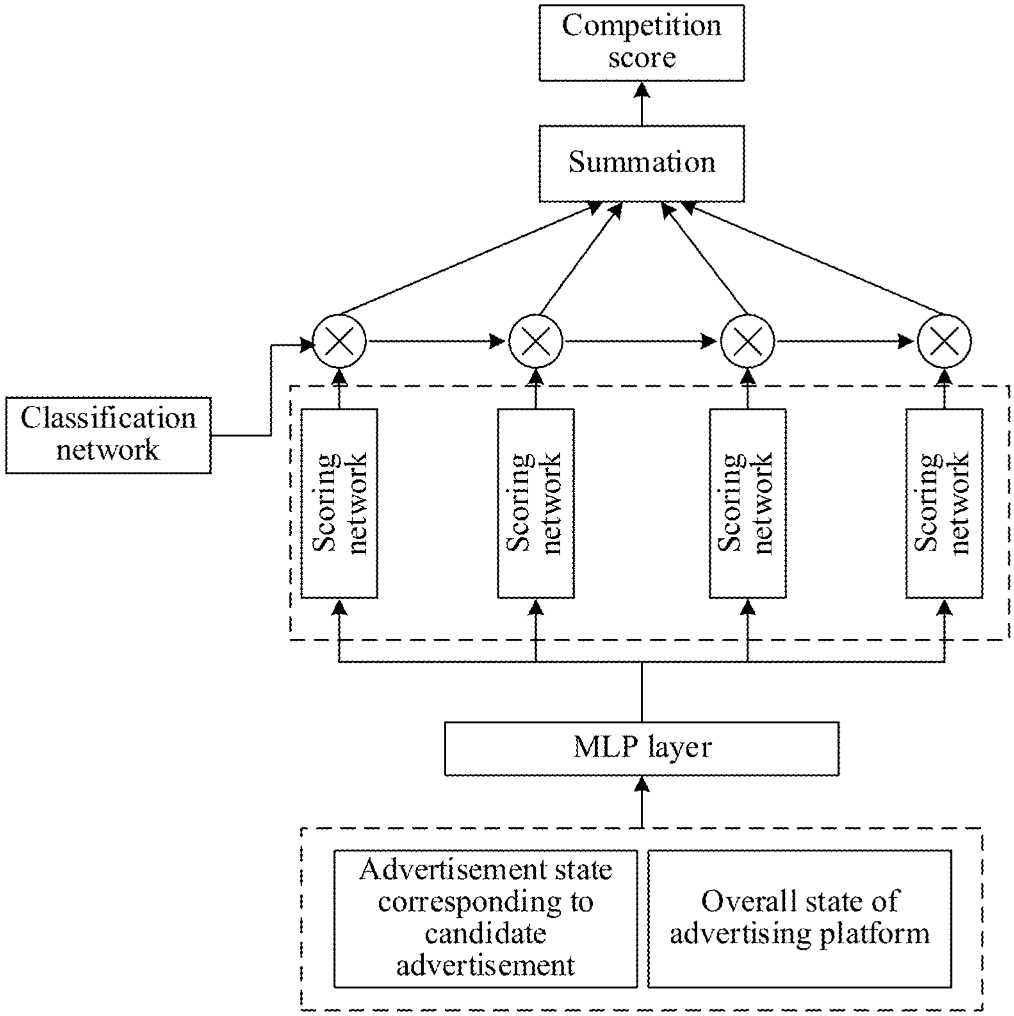
FIG. 5 is a schematic implementation diagram of another scoring mode of a scoring model according to certain embodiment(s) of the present disclosure.

Exemplarily, FIG. 5 shows an implementation process of this scoring mode of the scoring model. As shown in FIG. 5, the server may splice the advertisement state corresponding to the candidate advertisement with the overall state of the advertising platform. In certain embodiment(s), the spliced state is processed by the MLP layer in the scoring model to obtain a Tensor as the input feature of the candidate advertisement. In certain embodiment(s), the input feature of the candidate advertisement is processed by each scoring network in the scoring model, and a competition score configured for the candidate advertisement is outputted. Furthermore, weighted summation processing is accordingly performed on the competition scores configured for the candidate advertisement by the respective scoring networks based on the probability of the candidate advertisement belonging to different reference advertisement types, to obtain a competition score of the candidate advertisement for the current exposure request. For example, it is assumed that there are four reference advertisement types in total, and probability of a candidate advertisement belonging to the four reference advertisement types are 0.6, 0.1, 0.2, and 0.1. The scoring model may multiply 0.6 on the basis of a competition score configured by a scoring network corresponding to the first reference advertisement type, multiply 0.1 on the basis of a competition score configured by a scoring network corresponding to the second reference advertisement type, multiply 0.2 on the basis of a competition score configured by a scoring network corresponding to the third reference advertisement type, and multiply 0.1 on the basis of a competition score configured by a scoring network corresponding to the fourth reference advertisement type. Furthermore, the weighted processing results are summed to obtain a competition score of the candidate advertisement for the current exposure request.

In this way, all the scoring networks in the scoring model are enabled to configure the competition score for the candidate advertisement based on the input feature of the candidate advertisement, and weighted summation processing is performed on the competition scores configured by each of the scoring networks, whereby the accuracy of the determined competition score can be enhanced.

In certain embodiment(s), the server may determine, by the scoring network in the scoring model, a competition score of the candidate advertisement for the current exposure request by: determining, according to an advertisement state corresponding to a candidate advertisement and the overall state of the advertising platform, an input feature of the candidate advertisement; determining a scoring network corresponding to the candidate advertisement in the scoring model based on the probability of the candidate advertisement belonging to different reference advertisement types; furthermore, determining a competition score of the candidate advertisement for the current exposure request by the scoring network corresponding to the candidate advertisement according to the input feature of the candidate advertisement.

Figure 6:
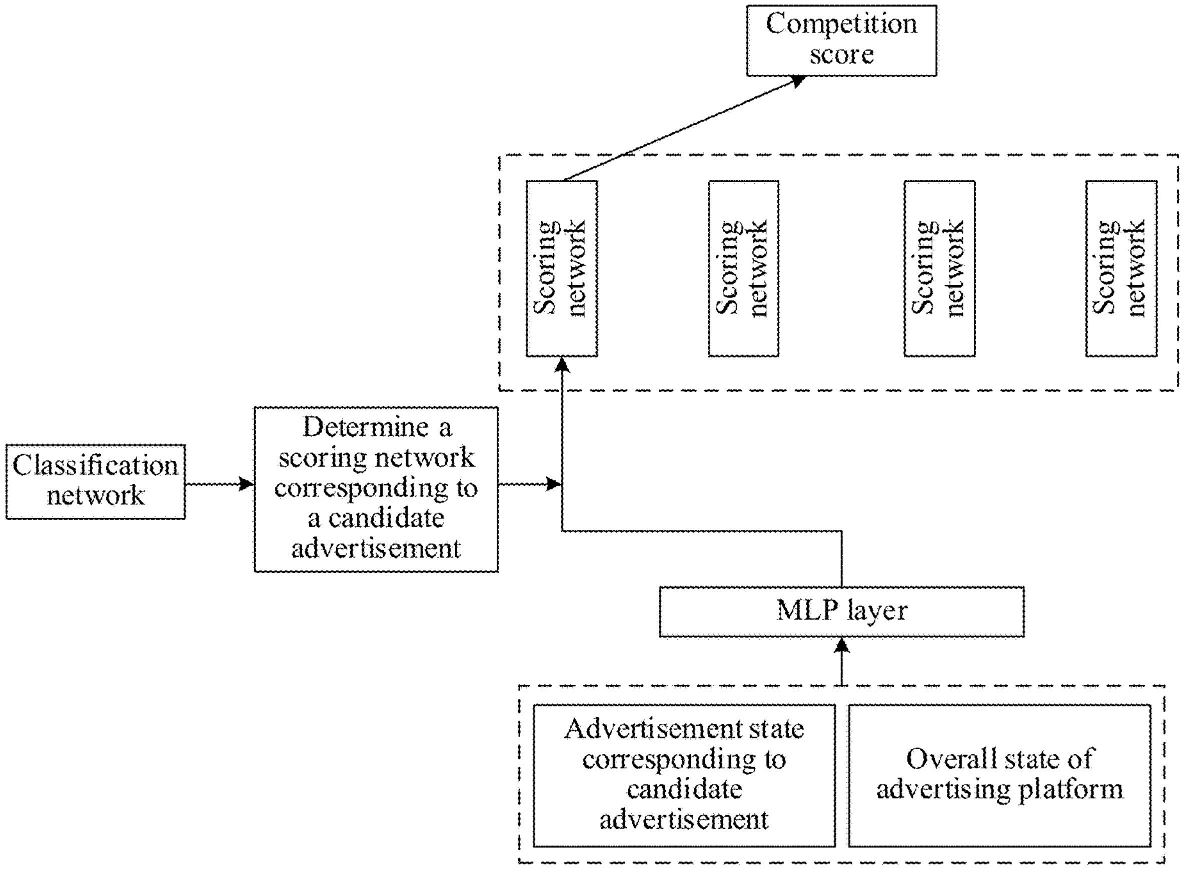
FIG. 6 is a schematic implementation diagram of yet another scoring mode of a scoring model according to certain embodiment(s) of the present disclosure.

Exemplarily, FIG. 6 shows an implementation process of this scoring mode of the scoring model. As shown in FIG. 6, the server may splice the advertisement state corresponding to the candidate advertisement with the overall state of the advertising platform. In certain embodiment(s), the spliced state is processed by the MLP layer in the scoring model to obtain a Tensor as the input feature of the candidate advertisement. Also, the scoring model may also determine a target reference advertisement type to which the candidate advertisement belongs according to the probability of the candidate advertisement belonging to different reference advertisement types. For example, a maximum probability is determined among the probability of the candidate advertisement belonging to different reference advertisement types. Furthermore, a reference advertisement type corresponding to the maximum probability is determined as the target reference advertisement type to which the candidate advertisement belongs. Accordingly, the scoring model may determine a scoring network corresponding to the target reference advertisement type as a scoring network corresponding to the candidate advertisement. For example, the scoring network corresponding to the candidate advertisement is a scoring network adapted to process an advertisement of the first reference advertisement type in FIG. 6. Furthermore, the input feature of the candidate advertisement is processed by the scoring network corresponding to the candidate advertisement, and a competition score of the candidate advertisement for the current exposure request is outputted.

In this way, the scoring network most suitable for scoring the candidate advertisement is selected from the scoring model, and the candidate advertisement is scored, whereby the accuracy of the determined competition score can be enhanced to some extent while reducing computing resources.

It is to be understood that the herein-described implementation of determining a competition score of the candidate advertisement for the current exposure request is merely an example. In practical implementations, the scoring model may also adopt other ways to determine the competition score of the candidate advertisement for the current exposure request using multiple scoring networks included therein. The present disclosure is not limited therein.

Step 204: Determine a target advertisement exposed by the current exposure request according to the competition score of each candidate advertisement for the current exposure request.

After the processing of the scoring model, the server will obtain the competition score of each candidate advertisement corresponding to the current exposure request for the current exposure request. Furthermore, the server may determine a target advertisement exposed by the current exposure request according to the competition score of each candidate advertisement for the current exposure request.

Exemplarily, the server may directly determine the candidate advertisement with the highest competition score for the current exposure request as a target advertisement exposed by the current exposure request. Or, the server may obtain an advertisement competition score corresponding to each candidate advertisement. The advertisement competition score is determined according to an advertisement content of the candidate advertisement. In certain embodiment(s), a total competition score of each candidate advertisement is determined according to the competition score of the candidate advertisement for the current exposure request and the advertisement competition score corresponding thereto. Finally, the candidate advertisement with the highest overall competition score is determined as the target advertisement exposed by the current exposure request. The mode of determining the target advertisement exposed by the current exposure request is not limited in any way by the present disclosure herein.

The data processing method uses a scoring model including multiple scoring networks to score each candidate advertisement corresponding to a current exposure request, and the multiple scoring networks in the scoring model are respectively adapted to score advertisements of different reference advertisement types. Different scoring networks in the scoring model are suitable for scoring the advertisements of different reference advertisement types. Therefore, when training the scoring model, each scoring network may be trained only by using applicable advertisements of reference advertisement types, whereby the action space of each scoring network is not too large, and the scoring network converges more easily in a smaller action space. That is to say, it is easier to enable the trained scoring network to have better performance. Accordingly, the scoring model including each of the scoring networks may also have a higher performance, and a score corresponding to each candidate advertisement can be determined. An advertisement finally exposed by an advertising platform is selected based on a score configured for the advertisement by the scoring model, which also helps the advertising platform to obtain a higher income.

Figure 7:
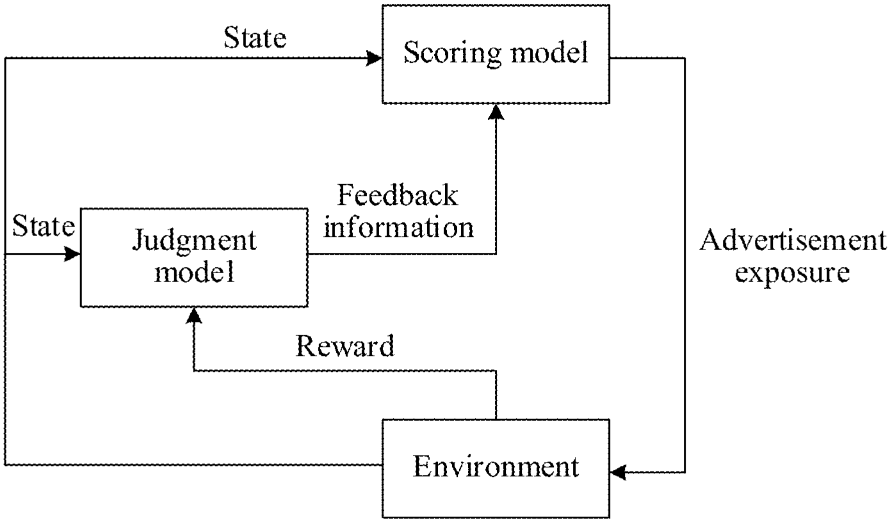
FIG. 7 is a schematic diagram of a reinforcement learning structure according to certain embodiment(s) of the present disclosure.

A scoring model training method according to the method embodiment shown in FIG. 2 will be described in detail below by a method embodiment. The scoring model in this embodiment of the present disclosure is trained based on a reinforcement learning mechanism. In order to facilitate understanding, the reinforcement learning mechanism will be described below with reference to a schematic diagram of an actor-critict (AC) reinforcement learning structure shown in FIG. 7.

The reinforcement learning mechanism explores the environment through the model, gives a score of each optional policy in a current environment state, and selects a policy to execute based on the score of each optional policy. After executing the policy, the environment state will be changed, and a corresponding reward (positive reward or negative reward) will be generated. The reward may provide reference in a next round of policy scoring process. Reinforcement learning aims to select an optimal policy, whereby the state of the environment is optimal after the execution of the optimal policy.

In an implementation scenario of training a scoring model for scoring a candidate advertisement corresponding to an exposure request, an environment may be a training candidate advertisement corresponding to a training exposure request. A scoring model to be trained (namely, actor net) is responsible for scoring the training candidate advertisement corresponding to the training exposure request. A training target advertisement (namely, action) exposed by the training exposure request is selected according to a score of each training candidate advertisement. After the training target advertisement is exposed, the state of a virtual advertising platform may be changed, and a reward corresponding to the advertisement exposure action may also be given. A judgment model (critict net) may give feedback information about this scoring operation on the trained scoring model according to the state of the virtual advertising platform and the reward value. The scoring model may use the feedback information as a reference when scoring each training candidate advertisement corresponding to the training exposure request next time.

Figure 8:
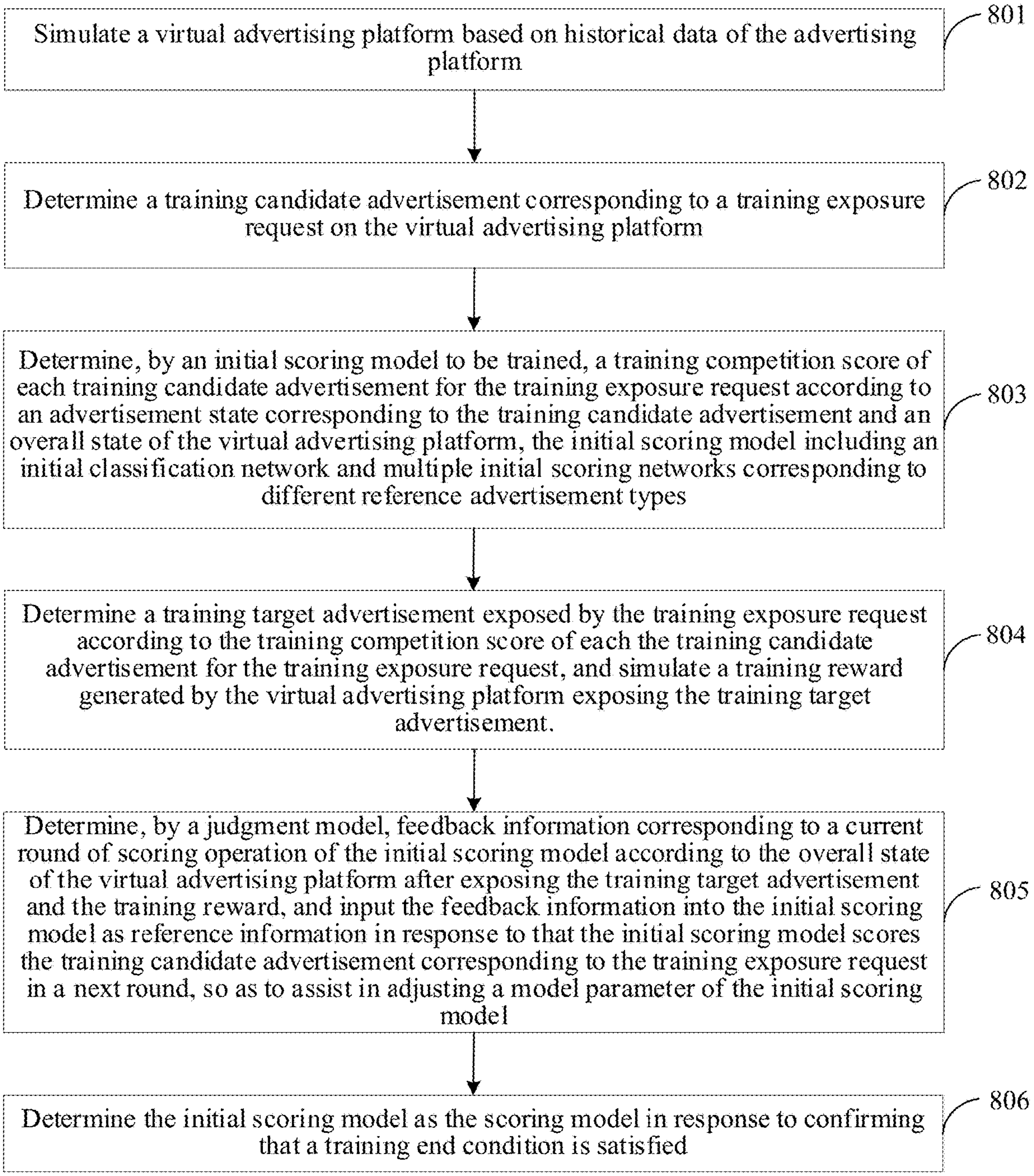
FIG. 8 is a schematic flowchart of a scoring model training method according to certain embodiment(s) of the present disclosure.

Reference is made to FIG. 8. FIG. 8 is a schematic flowchart of a scoring model training method according to an embodiment of the present disclosure. For ease of description, the following embodiment will still be described with an example in which the server performs the scoring model training method. It is to be understood that the scoring model training method may also be performed by the terminal device in practical implementations. As shown in FIG. 8, the scoring model training method includes the following steps:

Step 801: Simulate a virtual advertising platform based on historical data of the advertising platform.

In this embodiment of the present disclosure, before the server trains a scoring model, a virtual advertising platform may be simulated using historical data of the advertising platform so as to train the scoring model based on the environment of the virtual advertising platform.

In certain embodiment(s), the server may simulate the virtual advertising platform by: obtaining historical exposure request data, historical exposure log data, historical inventory data, and playing control parameters of historical placed advertisements of the advertising platform; constructing the training exposure request based on the historical exposure request data and the historical exposure log data, and determining a training candidate advertisement corresponding to the training exposure request; determining an advertisement state corresponding to the training candidate advertisement based on the historical inventory data and the playing control parameters of the historical placed advertisements; and determining an overall state of the virtual advertising platform based on the historical inventory data, the historical exposure log data, and the playing control parameters of the historical placed advertisements.

Figure 9:
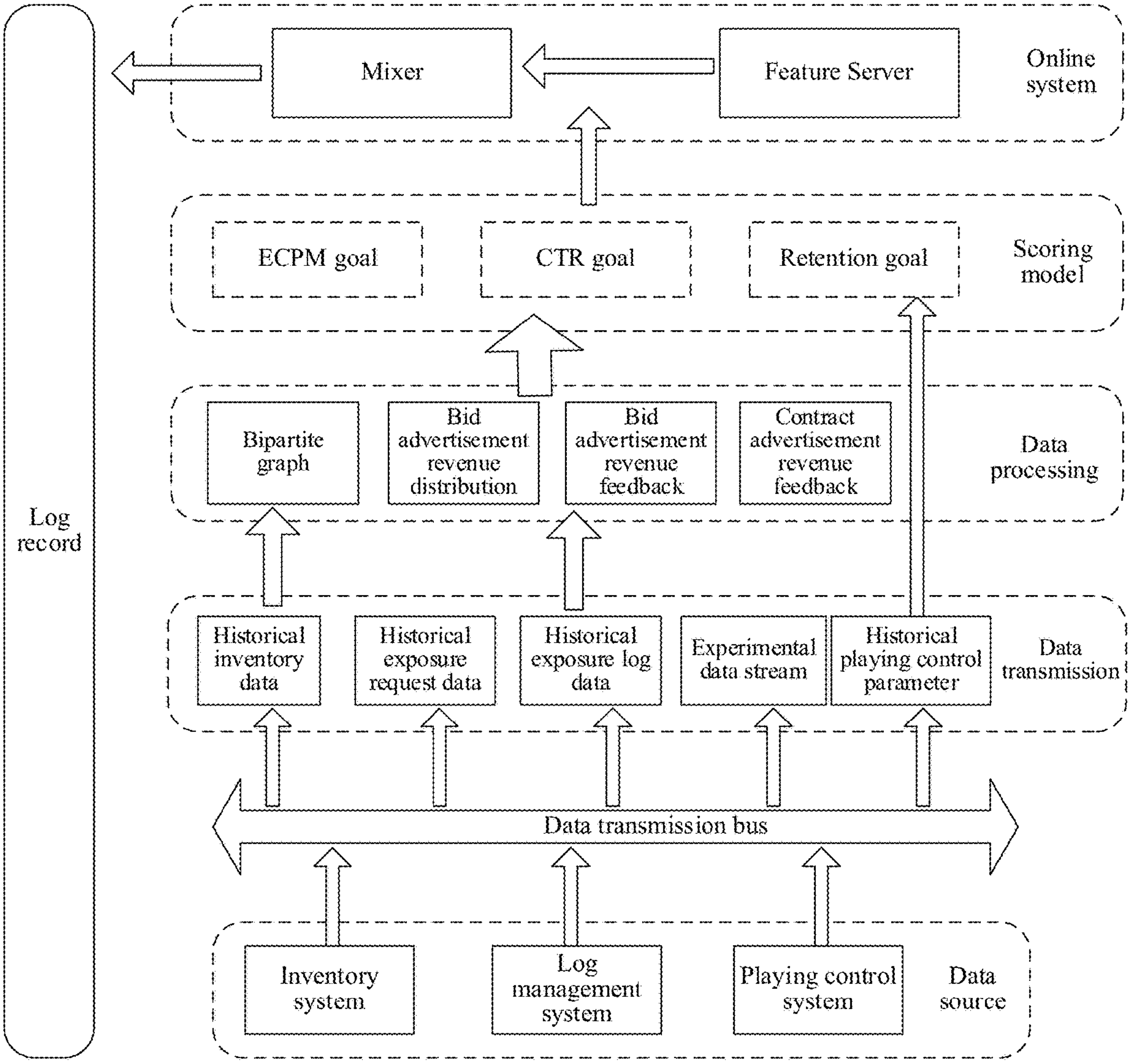
FIG. 9 is a schematic diagram of a construction mode and a working mode of a virtual advertising platform according to certain embodiment(s) of the present disclosure. disclosure.

FIG. 9 shows a construction mode and a working mode of a virtual advertising platform according to an embodiment of the present disclosure. As shown in FIG. 9, the construction of the virtual advertising platform is achieved through three stages: data source, data transmission, and data processing.

When the server constructs a virtual advertising platform, historical inventory data may be obtained from an inventory system of the advertising platform, historical exposure log data and historical exposure request data may be obtained from a log management system of the advertising platform, and historical playing control parameters of historical placed advertisements may be obtained from a playing control system of the advertising platform.

Figure 10:
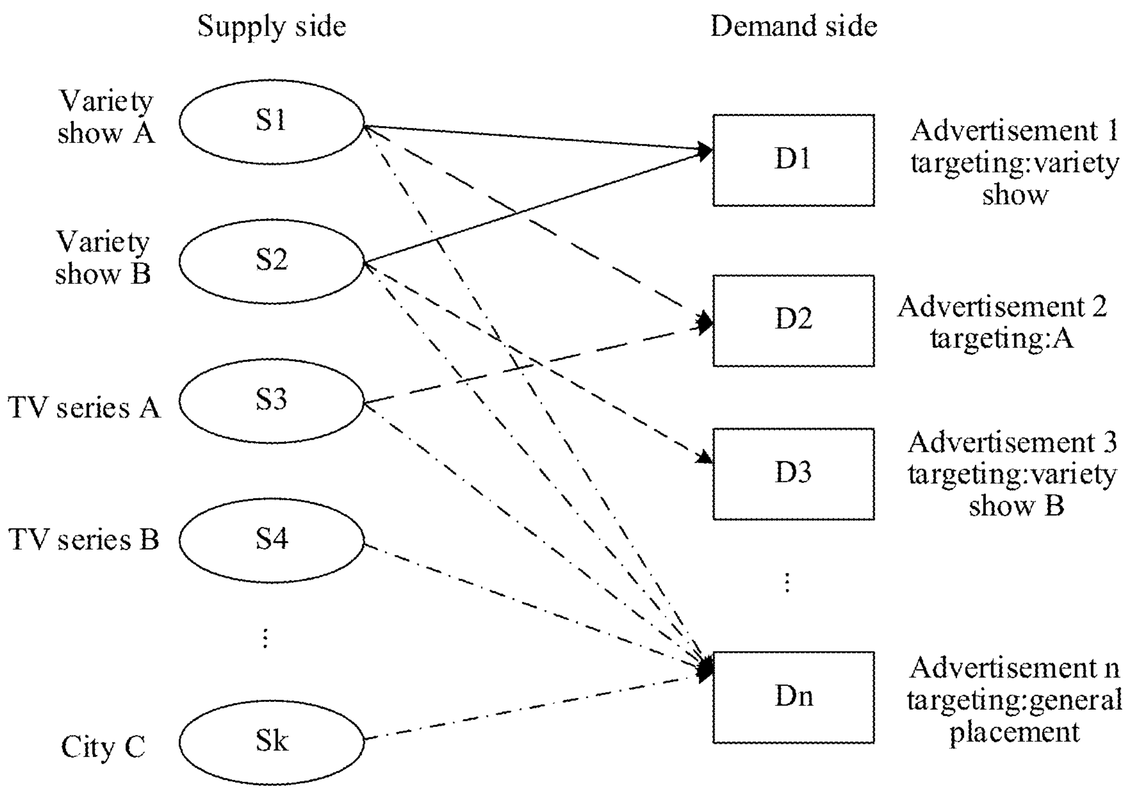
FIG. 10 is an exemplary bipartite graph of certain embodiment(s) of the present

The inventory data stored in the inventory system is derived from an inventory prediction service. The inventory prediction service is configured to predict a future available inventory of advertisements using the past advertisement placement data, may be more accurate to the mapping between each exposure request and each advertisement, and may determine the inventory of each advertisement over a given time interval. A bipartite graph is calculated based on the historical inventory data. The bipartite graph may reflect two valuable data: a playing probability of the contract advertisement and a playing curve of the current period. The playing probability may provide the advertising platform with a reference for retaining the contract advertisement (so as to achieve a retention target). The playing curve may provide the advertising platform with a crowded space of the contract advertisement. FIG. 10 shows an exemplary bipartite graph. A supply side is inventory data, which may be expressed by attribute dimensions, such as variety show A, variety show B, TV series A, TV series B, and city C (which may be represented by S1, S2, S3, S4, . . . , Sk). A demand side is advertisement data, which may be expressed by attribute dimensions of targeting conditions, such as variety shows, variety shows A and B, and general placement (which may be represented by D1, D2, D3, D4, . . . , Dn). By associating the attribute dimensions of the supply side with the attribute dimensions of the demand side, a mapping relationship between the inventory data and the advertisement data may be obtained.

In addition, at this stage of data processing, it is also possible to obtain bid advertisement revenue distributions and bid advertisement revenue feedbacks for bid advertisements, and obtain contract advertisement revenue feedbacks for contract advertisements.

In this embodiment of the present disclosure, the advertisement state corresponding to the training candidate advertisement may be determined based on the historical inventory data obtained from the inventory system of the advertising platform. For example, when the training candidate advertisement is a contract advertisement, a playing shortage, a playing excess and the like corresponding thereto are determined. It is also possible to determine the overall state of the simulated virtual advertising platform based on the obtained historical inventory data, such as determining a playing shortage, a playing excess and the like of the overall virtual advertising platform.

The exposure request data stored in the log management system is each historical exposure request generated by the terminal device side and a corresponding targeting attribute thereof. The exposure log data stored in the log management system includes two types: exposure log data track_log at a request level, and exposure log data joined_exposure at an exposure level. The track_log includes a candidate advertisement queue corresponding to each exposure request after fine ranking processing, and an effective cost per mille (ECPM), a predict click-through rate (PCTR), a filtering condition, a support policy, and the like of each bid advertisement in the candidate advertisement queue. The joined_exposure includes an advertisement truly exposed by each exposure request finally, and charging information, ECPM information, and the like corresponding to the advertisement.

In this embodiment of the present disclosure, a training exposure request may be constructed based on the historical exposure request data and the historical exposure log data obtained from the log management system, and a training candidate advertisement corresponding to the training exposure request may be determined. An overall state of the virtual advertising platform may also be determined based on the obtained historical exposure log data.

The playing control parameters of advertisements stored in the playing control system are parameters for controlling the playing of the advertisements. The playing control parameter of the contract advertisement may be, for example, Rate, Theta, or the like, to assist in adjusting the playing situation of the contract advertisement, and is key information for retaining the contract advertisement. The playing control parameter of the bid advertisement may be, for example, a bid for the advertisement by an advertiser, or the like.

In this embodiment of the present disclosure, an advertisement state corresponding to the training candidate advertisement corresponding to the training exposure request may be determined based on the playing control parameters obtained from the playing control system.

It is to be understood that the mode of simulating the virtual advertising platform is merely an example. In practical implementations, the server may also simulate the virtual advertising platform in other manners. The present disclosure is not limited thereto.

Step 802: Determine a training candidate advertisement corresponding to a training exposure request on the virtual advertising platform.

As described in step 801, when the server simulates the virtual advertising platform, a training exposure request may be constructed based on the obtained historical exposure request data, and a training candidate advertisement corresponding to the training exposure request is determined based on the historical exposure log data.

In addition, the server also may determine an advertisement state corresponding to each training candidate advertisement. For example, the advertisement state corresponding to the training candidate advertisement is determined based on the historical inventory data corresponding to the training candidate advertisement and the playing control parameter thereof. The server also may determine an overall state of the virtual advertising platform. For example, a current exposure task performance situation of the virtual advertising platform is simulated based on the obtained historical inventory data, historical exposure log data and playing control parameter of each historical placed advertisement, so as to determine the overall state of the virtual advertising platform.

Step 803: Determine, by an initial scoring model to be trained, a training competition score of each training candidate advertisement for the training exposure request according to an advertisement state corresponding to the training candidate advertisement and an overall state of the virtual advertising platform, the initial scoring model including an initial classification network and multiple initial scoring networks corresponding to different reference advertisement types.

Furthermore, the initial scoring model to be trained is trained based on the training candidate advertisement corresponding to the training exposure request. That is, the initial scoring model to be trained determines a training competition score of each training candidate advertisement for the training exposure request according to an advertisement state corresponding to the training candidate advertisement and an overall state of the virtual advertising platform.

It is to be understood that the initial scoring model trained in this embodiment of the present disclosure has the same structure and working principle as the scoring model in the embodiment of FIG. 2, and the details may be similar to the relevant introduction of the scoring network in the embodiment of FIG. 2. The initial scoring model includes an initial classification network and multiple initial scoring networks corresponding to various reference advertisement types in a classification manner. The initial classification network is configured to determine probability of the training candidate advertisement belonging to different reference advertisement types. The initial scoring network is configured to configure a training competition score for the training candidate advertisement according to the advertisement state corresponding to the training candidate advertisement and the overall state of the virtual advertising platform.

When training the initial scoring model based on the reinforcement learning mechanism, in addition to inputting the advertisement state corresponding to the training candidate advertisement and the overall state of the virtual advertising platform into the trained initial scoring model, it is also desirable to input reference information into the initial scoring model. The reference information is feedback information given by a judgment model for a previous round of scoring operation on the initial scoring model. The previous round of scoring operation is also performed on each training candidate advertisement corresponding to the training exposure request.

In certain embodiment(s), after the initial scoring model performs the scoring operation of each training candidate advertisement corresponding to the training exposure request in each round and selects an advertisement finally exposed based on the training competition score of each training candidate advertisement for the training exposure request, the judgment model will provide feedback information about this round of scoring operation on the initial scoring model according to a change situation of the overall state of the virtual advertising platform and a relevant reward value. The feedback information reflects whether this round of scoring operation on the initial scoring model is good or bad. It is to be understood that the feedback information reflects that this round of scoring operation on the initial scoring model is good, indicating that an advertisement exposure operation performed based on the scoring result of this round of scoring operation on the initial scoring model tends to increase the overall revenue of the virtual advertising platform. The feedback information reflects that this round of scoring operation on the initial scoring model is bad, indicating that the advertisement exposure operation performed based on the scoring result of this round of scoring operation on the initial scoring model tends to reduce the overall revenue of the virtual advertising platform. When each training candidate advertisement corresponding to the training exposure request is scored again by the initial scoring model in a next round, the feedback information may be inputted into the initial scoring model together with the advertisement state corresponding to the training candidate advertisement and the overall state of the virtual advertising platform.

In certain embodiment(s), when the server trains each initial scoring network in the initial scoring model, probability of each training candidate advertisement belonging to different reference advertisement types may be determined by the initial classification network in the initial scoring model. In certain embodiment(s), a target reference advertisement type to which the training candidate advertisement belongs is determined according to the probability of the training candidate advertisement belonging to different reference advertisement types. Furthermore, an initial scoring network corresponding to the target reference advertisement type in the initial scoring model determines a training competition score of the training candidate advertisement for the training exposure request according to the advertisement state corresponding to the training candidate advertisement, the overall state of the virtual advertising platform, and reference information. The reference information herein is the feedback information given by the judgment model introduced herein for the previous scoring operation on the initial scoring network, and the scoring operation is performed on the training candidate advertisement corresponding to the training exposure request.

Exemplarily, the server may first splice the advertisement state corresponding to a certain training candidate advertisement, the overall state of the virtual advertising platform and the reference information, and process data obtained by splicing via the MLP layer, so as to obtain an input feature of the training candidate advertisement. In certain embodiment(s), the server may input the input feature of the training candidate advertisement into the initial scoring model. After the initial scoring network in the initial scoring model correspondingly processes the input feature, probability of the training candidate advertisement belonging to different reference advertisement types will be outputted. In certain embodiment(s), the initial scoring model may determine a reference advertisement type to which the training candidate advertisement belongs as a target reference advertisement type according to the probability of the training candidate advertisement belonging to different reference advertisement types. Furthermore, the initial scoring model will invoke the initial scoring network corresponding to the target reference advertisement type, process the input feature of the training candidate advertisement by the initial scoring network, and finally output a training competition score of the training candidate advertisement for the training exposure request.

In this way, a correspondence between the initial scoring networks in the initial scoring model and the reference advertisement types is preset. After an initial scoring network in the initial scoring model determines a reference advertisement type to which a certain training candidate advertisement belongs, the initial scoring network corresponding to the reference advertisement type may directly scory the training candidate advertisement, whereby each initial scoring network may learn the features of the advertisement belonging to the reference advertisement type corresponding thereto in a focused manner, thereby realizing the specialization of each initial scoring network.

In certain embodiment(s), when the server trains each initial scoring network in the initial scoring model, an input feature of each training candidate advertisement may be determined according to the advertisement state corresponding to the training candidate advertisement, the overall state of the virtual advertising platform, and reference information. The reference information herein is feedback information provided by the judgment model for a previous round of scoring operation on the initial scoring network, and the scoring operation is performed on the training candidate advertisement corresponding to the training exposure request. In certain embodiment(s), the initial classification network in the initial scoring model determines probability of the training candidate advertisement belonging to different reference advertisement types, and weighted processing is performed on the input feature of the training candidate advertisement based on probability of the training candidate advertisement belonging to different reference advertisement types, to obtain an input feature of the training candidate advertisement under each reference advertisement type. Furthermore, the initial scoring network in the initial scoring model determines a training competition score of the training candidate advertisement for the training exposure request according to the input features of the training candidate advertisement under different reference advertisement types.

Exemplarily, the server may first splice the advertisement state corresponding to a certain training candidate advertisement, the overall state of the virtual advertising platform and the reference information, and process data obtained by splicing via the MLP layer, so as to obtain an input feature of the training candidate advertisement. In certain embodiment(s), the server may input the input feature of the training candidate advertisement into the initial scoring model. After the initial scoring network in the initial scoring model correspondingly processes the input feature, probability of the training candidate advertisement belonging to different reference advertisement types will be outputted. In certain embodiment(s), the initial scoring model may perform weighted processing on the input feature of the training candidate advertisement based on probability of the training candidate advertisement belonging to different reference advertisement types, to obtain input features of the training candidate advertisement under various reference advertisement types. Furthermore, each initial scoring network in the initial scoring model may process the input feature of the training candidate advertisement under the corresponding reference advertisement type, and configure a training competition score for the training candidate advertisement. Finally, the training competition scores configured for the training candidate advertisement by the various initial scoring networks are averaged to obtain a competition score of the training candidate advertisement for the training exposure request.

This model training mode is compared with the mode of training only a single network structure in certain existing technology. Assuming that a training exposure request corresponds to 10000 training candidate advertisements, when using a single scoring network to score each training candidate advertisement in certain existing technology, the scoring network may predict 10000 training competition scores, and counter-propagates a gradient. When there are two training candidate advertisements with a great difference, the scoring network is likely to have a large positive gradient and a large negative gradient, which makes the scoring network oscillating and unable to converge. After being classified by the initial classification network in this embodiment of the present disclosure, input features of advertisements which do not belong to a reference advertisement type applicable to a certain scoring network may be small due to a classification probability, and accordingly, a competition score outputted thereby has a small influence on an overall competition score. On the contrary, input features of advertisements which do not belong to a reference advertisement type applicable to a certain scoring network may be large due to the classification probability, whereby the former is small in gradient, the latter is large in gradient, and each scoring network can learn better about the reference advertisement type applicable thereto.

It is to be understood that the working mode of the initial scoring model is merely an example. In practical implementations, the initial scoring model may also work based on other working modes. The present disclosure is not limited thereto.

Step 804: Determine a training target advertisement exposed by the training exposure request according to the training competition score of each training candidate advertisement for the training exposure request, and simulate a training reward generated by the virtual advertising platform exposing the training target advertisement.

After the server determines a competition score of each training candidate advertisement for the training exposure request by the initial scoring model, a training target advertisement exposed by the training exposure request may be determined according to the competition score of each training candidate advertisement for the training exposure request.

Furthermore, it is possible to simulate a scene where the virtual advertising platform exposes the training target advertisement, and accordingly determine the overall state of the virtual advertising platform after exposing the training target advertisement, for example, simulating the shortage, excess, revenue, and the like of the overall virtual advertising platform after exposing the training target advertisement. In addition, it is also possible to simulate a training reward generated after the virtual advertising platform exposes the training target advertisement. For example, it is assumed that an advertisement exposure rate of the virtual advertising platform is preferred to be higher. If the training target advertisement exposed currently is an advertisement without an excess, a positive training reward may be given. On the contrary, if the training target advertisement exposed currently is an advertisement with an excess, a negative training reward may be given.

In certain embodiment(s), the server may determine the training target advertisement exposed by the training exposure request by: obtaining an advertisement competition score corresponding to each training candidate advertisement, the advertisement competition score being determined according to an advertisement feature of the training candidate advertisement corresponding thereto; and determining the training target advertisement according to a training competition score of each training candidate advertisement for the training exposure request and the advertisement competition score.

As shown in FIG. 9, after the virtual advertising platform determines a training competition score of each training candidate advertisement for the training exposure request by the initial scoring model, an advertisement exposed by the training exposure request may be selected from the training candidate advertisements through an online system of the virtual advertising platform. The online system of the virtual advertising platform may include a feature server and a mixer. The feature server may obtain a training competition score and an advertisement competition score of each training candidate advertisement for the training exposure request. The advertisement competition score herein is determined according to an advertisement feature of the training candidate advertisement corresponding thereto. In certain embodiment(s), the mixer may obtain an advertisement competition score corresponding to each training candidate advertisement from the feature server and a training competition score for the training exposure request. Furthermore, a total competition score of each training candidate advertisement is determined according to the advertisement competition score corresponding thereto and the training competition score for the training exposure request. Finally, the training candidate advertisement with the highest total competition score is selected to be exposed as a training target advertisement exposed by the training exposure request. After the virtual advertising platform performs the exposure of the training target advertisement, data related to this exposure operation may be recorded in a log.

Goals of the scoring model in FIG. 9 may include ECPM goals, CTR goals, and retention goals.

Step 805: Determine, by a judgment model, feedback information corresponding to a current round of scoring operation of the initial scoring model according to the overall state of the virtual advertising platform after exposing the training target advertisement and the training reward, and input the feedback information into the initial scoring model as reference information in response to that the initial scoring model scores the training candidate advertisement corresponding to the training exposure request in a next round, so as to assist in adjusting a model parameter of the initial scoring model.

As introduced in step 803, each time after the virtual advertising platform performs the exposure operation of the training target advertisement, the server may input the overall state of the virtual advertising platform after exposing the training target advertisement and the training reward into a judgment model. The judgment model outputs feedback information about the current round of scoring operation on the initial scoring model by correspondingly processing the input data. The feedback information reflects whether the influence of the training target advertisement exposed based on the current round of scoring operation on the initial scoring model on the overall revenue of the virtual advertising platform is positive or negative, and when the initial scoring model scores the training candidate advertisement corresponding to the training exposure request in a next round, the feedback information is inputted into the initial scoring model as reference information so as to assist in adjusting a model parameter of the initial scoring model, whereby the model performance of the initial scoring model tends to be better.

Step 806: Determine the initial scoring model as the scoring model in response to confirming that a training end condition is satisfied.

The server may cyclically perform step 802 to step 805 based on each training exposure request. After completing a round of corresponding exposure operation on each training exposure request, the server may record an overall revenue situation of the virtual advertising platform at this moment. In this way, multiple rounds of corresponding exposure operations are performed on each training exposure request, and the overall revenue situation of the virtual advertising platform after each round of exposure operation is recorded. When it is determined that the overall revenue of the virtual advertising platform is basically stable and no longer greatly increased, it may be determined that a training end condition has been satisfied currently, and it may be determined that the initial scoring model at this moment is taken as a scoring model which may be put into practical implementations, namely, the scoring model in the embodiment shown in FIG. 2.

In this embodiment of the present disclosure, a model training method is provided for the scoring model in the embodiment shown in FIG. 2. When training a scoring model including multiple scoring networks using this method, each scoring network may be trained by using applicable advertisements of reference advertisement types, whereby the action space of each scoring network is not too large, and the scoring network converges more easily in a smaller action space. That is to say, it is easier to enable the trained scoring network to have better performance. Accordingly, the scoring model including each of the scoring networks may also have a higher performance, and a score corresponding to each candidate advertisement can be determined.

An advertisement exposure method provided in an embodiment of the present disclosure is put into use in an actual advertising platform. The overall revenue situation of the advertising platform and the ECPM of a bid advertisement have been significantly improved, where the ECPM of the bid advertisement is improved by 4.2%, and the consumption is improved by 7.1%.

The present disclosure also provides a data processing apparatus corresponding to the data processing method described herein, whereby the data processing method may be applied and realized in practice.

Figure 11:
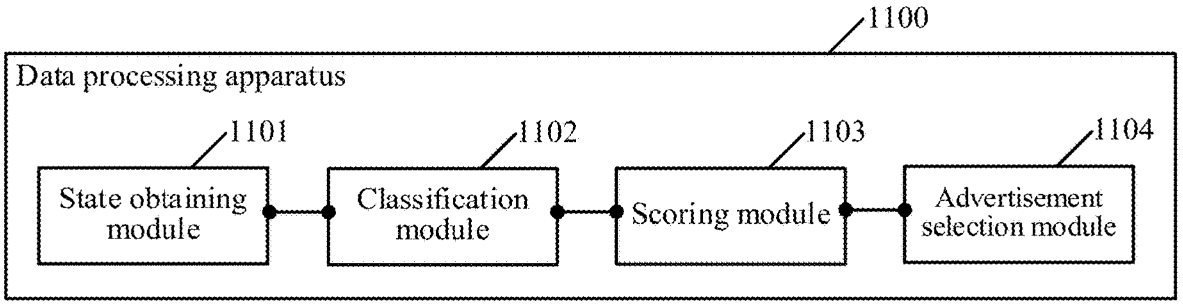
FIG. 11 is a schematic structural diagram of a data processing apparatus according to certain embodiment(s) of the present disclosure.

Reference is made to FIG. 11. FIG. 11 is a schematic structural diagram of a data processing apparatus 1100 corresponding to the data processing method shown in FIG. 2. As shown in FIG. 11, the data processing apparatus 1100 includes:

- a state obtaining module 1101, configured to obtain an advertisement state corresponding to each candidate advertisement corresponding to a current exposure request, the advertisement state representing a competition condition in response to that the candidate advertisement corresponding thereto competes for the current exposure request, and to obtain an overall state of an advertising platform in response to the current exposure request, the overall state representing a current exposure task performance situation of the advertising platform;
- a classification module 1102, configured to determine, by a classification network in a scoring model, probability of each candidate advertisement belonging to different reference advertisement types;
- a scoring module 1103, configured to determine, by a scoring network in the scoring model, a competition score of each candidate advertisement for the current exposure request according to the advertisement state corresponding to the candidate advertisement and the overall state based on the probability of the candidate advertisement belonging to different reference advertisement types, the scoring model including multiple scoring networks corresponding to different reference advertisement types; and an advertisement selection module 1104, configured to determine a target advertisement exposed by the current exposure request according to the competition score of each candidate advertisement for the current exposure request.

In certain embodiment(s), on the basis of the data processing apparatus shown in FIG. 11, the scoring module 1103 is further configured to:

determine an input feature of the candidate advertisement according to the advertisement state corresponding to the candidate advertisement and the overall state;

perform, based on the probability of the candidate advertisement belonging to different reference advertisement types, weighted processing on the input feature of the candidate advertisement to obtain an input feature of the candidate advertisement under each reference advertisement type;

configure, by each of the scoring networks in the scoring model, a competition score for the candidate advertisement according to the input feature of the candidate advertisement under the reference advertisement type corresponding to the scoring network; and determine a competition score of the candidate advertisement for the current exposure request through the competition scores configured for the candidate advertisement by each of the scoring networks in the scoring model.

In certain embodiment(s), on the basis of the data processing apparatus shown in FIG. 11, the scoring module 1103 is further configured to:

determine an input feature of the candidate advertisement according to the advertisement state corresponding to the candidate advertisement and the overall state;

configure a competition score for the candidate advertisement by each of the scoring networks in the scoring model according to the input feature of the candidate advertisement; and perform weighted summation processing on the competition score configured for the candidate advertisement by each of the scoring networks based on the probability of the candidate advertisement belonging to different reference advertisement types, to obtain a competition score of the candidate advertisement for the current exposure request.

In certain embodiment(s), on the basis of the data processing apparatus shown in FIG. 11, the scoring module 1103 is further configured to:

determine an input feature of the candidate advertisement according to the advertisement state corresponding to the candidate advertisement and the overall state;

determine a scoring network corresponding to the candidate advertisement in the scoring model based on the probability of the candidate advertisement belonging to different reference advertisement types; and determine a competition score of the candidate advertisement for the current exposure request by the scoring network corresponding to the candidate advertisement according to the input feature of the candidate advertisement.

In certain embodiment(s), on the basis of the data processing apparatus shown in FIG. 11, the classification module 1102 is further configured to determine probability of the candidate advertisement belonging to different reference advertisement types in any one of the following manners:

determining, by the classification network, probability of the candidate advertisement belonging to different reference advertisement types according to the advertisement state corresponding to the candidate advertisement and the overall state;

determining, by the classification network, probability of the candidate advertisement belonging to different reference advertisement types according to the advertisement state corresponding to the candidate advertisement; and determining, by the classification network, probability of the candidate advertisement belonging to different reference advertisement types according to an advertisement feature corresponding to the candidate advertisement.

In certain embodiment(s), on the basis of the data processing apparatus shown in FIG. 11, the candidate advertisement includes at least one of a contract advertisement and a bid advertisement.

An advertisement state corresponding to the contract advertisement includes a competition environment in response to that the contract advertisement competes for the current exposure request, which is determined according to advertisement features of other advertisements in the candidate advertisement except the contract advertisement. The advertisement state corresponding to the contract advertisement further includes at least one of the following information: a playing amount, a shortage, a predetermined playing amount, a selling price, a playing control parameter, and a targeting condition of the contract advertisement.

An advertisement state corresponding to the bid advertisement includes a competition environment in response to that the bid advertisement competes for the current exposure request, which is determined according to advertisement features of other advertisements in the candidate advertisement except the bid advertisement.

Figure 12:
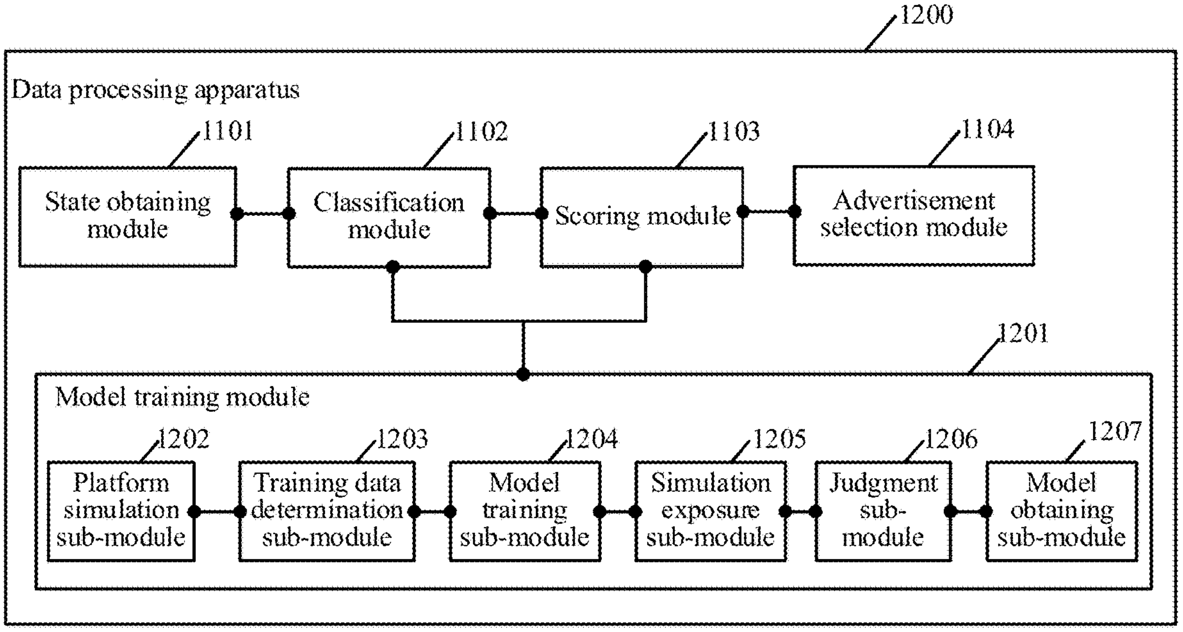
FIG. 12 is another schematic structural diagram of a data processing apparatus according to certain embodiment(s) of the present disclosure.

In certain embodiment(s), on the basis of the data processing apparatus shown in FIG. 11, reference is made to FIG. 12. FIG. 12 is a schematic structural diagram of another data processing apparatus 1200 according to an embodiment of the present disclosure. As shown in FIG. 12, the apparatus further includes a model training module 1201. The model training module 1201 includes:

a platform simulation sub-module 1202, configured to simulate a virtual advertising platform based on historical data of the advertising platform;

a training data determination sub-module 1203, configured to determine a training candidate advertisement corresponding to a training exposure request on the virtual advertising platform;

a model training sub-module 1204, configured to determine, by an initial scoring model to be trained, a training competition score of each training candidate advertisement for the training exposure request according to an advertisement state corresponding to the training candidate advertisement and an overall state of the virtual advertising platform, the initial scoring model including an initial classification network and multiple initial scoring networks corresponding to different reference advertisement types;

a simulation exposure sub-module 1205, configured to determine a training target advertisement exposed by the training exposure request according to the training competition score of each training candidate advertisement for the training exposure request, and simulate a training reward generated by the virtual advertising platform exposing the training target advertisement;

a judgment sub-module 1206, configured to determine, by a judgment model, feedback information corresponding to a current round of scoring operation of the initial scoring model according to the overall state of the virtual advertising platform after exposing the training target advertisement and the training reward, and input the feedback information into the initial scoring model as reference information in response to that the initial scoring model scores the training candidate advertisement corresponding to the training exposure request in a next round, so as to assist in adjusting a model parameter of the initial scoring model; and a model acquisition sub-module 1207, configured to determine the initial scoring model as the scoring model in response to confirming that a training end condition is satisfied.

In certain embodiment(s), on the basis of the data processing apparatus shown in FIG. 12, the model training sub-module 1204 is further configured to:

determine, by the initial classification network in the initial scoring model, probability of each training candidate advertisement belonging to different reference advertisement types;

determine a target reference advertisement type to which the training candidate advertisement belongs according to the probability of the training candidate advertisement belonging to different reference advertisement types; and determine, by an initial scoring network corresponding to the target reference advertisement type in the initial scoring model, a training competition score of the training candidate advertisement for the training exposure request according to the advertisement state corresponding to the training candidate advertisement, the overall state of the virtual advertising platform, and reference information, the reference information being feedback information provided by the judgment model for a previous round of scoring operation on the initial scoring network, and the scoring operation being performed on the training candidate advertisement corresponding to the training exposure request.

In certain embodiment(s), on the basis of the data processing apparatus shown in FIG. 12, the model training sub-module 1204 is further configured to:

determine an input feature of each training candidate advertisement according to the advertisement state corresponding to the training candidate advertisement, the overall state of the virtual advertising platform, and reference information; the reference information being feedback information provided by the judgment model for a previous round of scoring operation on the initial scoring network, and the scoring operation being performed on the training candidate advertisement corresponding to the training exposure request;

determine, by the initial classification network in the initial scoring model, probability of the training candidate advertisement belonging to different reference advertisement types;

perform, based on the probability of the training candidate advertisement belonging to different reference advertisement types, weighted processing on the input feature of the training candidate advertisement to obtain an input feature of the training candidate advertisement under each reference advertisement type; and determine, by the initial scoring network in the initial scoring model, a training competition score of the training candidate advertisement for the training exposure request according to the input features of the training candidate advertisement under different reference advertisement types.

In certain embodiment(s), on the basis of the data processing apparatus shown in FIG. 12, the platform simulation sub-module 1202 is further configured to:

obtain historical exposure request data, historical exposure log data, historical inventory data, and playing control parameters of historical placed advertisements of the advertising platform;

construct the training exposure request based on the historical exposure request data and the historical exposure log data, and determine a training candidate advertisement corresponding to the training exposure request;

determine an advertisement state corresponding to the training candidate advertisement based on the historical inventory data and the playing control parameters of the historical placed advertisements; and determine an overall state of the virtual advertising platform based on the historical inventory data, the historical exposure log data, and the playing control parameters of the historical placed advertisements.

In certain embodiment(s), on the basis of the data processing apparatus shown in FIG. 12, the simulation exposure sub-module 1205 is further configured to:

obtain an advertisement competition score corresponding to each training candidate advertisement, the advertisement competition score being determined according to an advertisement feature of the training candidate advertisement corresponding thereto; and determine the training target advertisement according to a training competition score of each training candidate advertisement for the training exposure request and the advertisement competition score.

The data processing apparatus uses a scoring model including multiple scoring networks to score each candidate advertisement corresponding to a current exposure request, and the multiple scoring networks in the scoring model are respectively adapted to score advertisements of different reference advertisement types. Different scoring networks in the scoring model are suitable for scoring the advertisements of different reference advertisement types. Therefore, when training the scoring model, each scoring network may be trained only by using applicable advertisements of reference advertisement types, whereby the action space of each scoring network is not too large, and the scoring network converges more easily in a smaller action space. That is to say, it is easier to enable the trained scoring network to have better performance. Accordingly, the scoring model including each of the scoring networks may also have a higher performance, and a score corresponding to each candidate advertisement can be determined. An advertisement finally exposed by an advertising platform is selected based on a score configured for the advertisement by the scoring model, which also helps the advertising platform to obtain a higher income.

An embodiment of the present disclosure also provides a computing device for data processing. The computing device may be a terminal device or a server. The terminal device and the server provided in this embodiment of the present disclosure will be described from the perspective of hardware substantialization.

Figure 13:
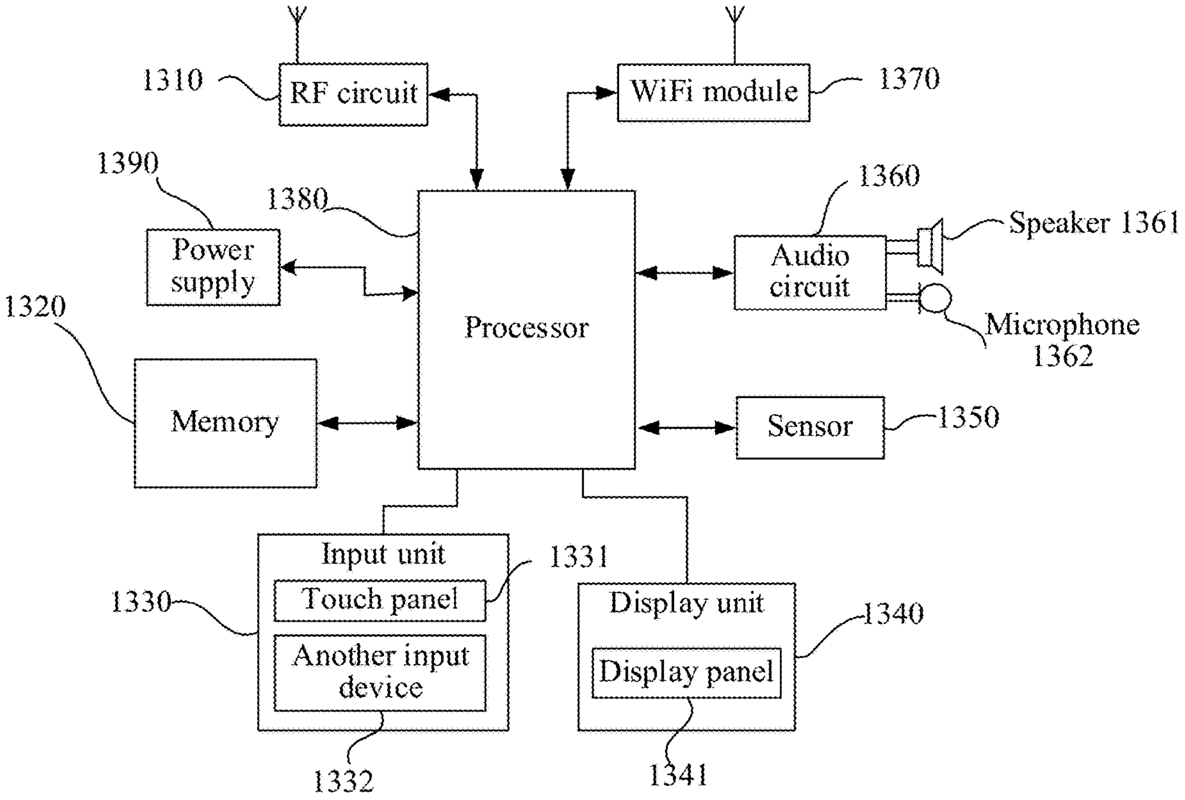
FIG. 13 is a schematic structural diagram of a terminal device according to certain embodiment(s) of the present disclosure.

Reference is made to FIG. 13. FIG. 13 is a schematic structural diagram of a terminal device according to an embodiment of the present disclosure. As shown in FIG. 13, only a part related to this embodiment of the present disclosure is shown for the convenience of explanation. For the technical details not disclosed, reference is made to the method part in the embodiments of the present disclosure. Taking the terminal device being a smartphone as an example:

FIG. 13 shows a block diagram of a structure of a part of a smartphone according to an embodiment of the present disclosure. Referring to FIG. 13, a computer includes: a radio frequency (RF) circuit 1310, a memory 1320, an input unit 1330 (including a touch panel 1331 and another input device 1332), a display unit 1340 (including a display panel 1341), a sensor 1350, an audio circuit 1360 (which may be connected to a speaker 1361 and a microphone 1362), a WiFi module 1370, a processor 1380, a power supply 1390, and other components. A person skilled in the art may understand that the structure of the smartphone shown in FIG. 13 does not constitute a limitation on the smartphone, and the smartphone may include more components or fewer components than those shown in the figure, or some components may be combined, or different component deployments may be used.

The memory 1320 may be configured to store a software program and module, such as the modules described in this disclosure. The processor 1380 operates the software program and module stored in the memory 1320, to implement various functional implementations and data processing of the computer. The memory 1320 may include a program storage region and a data storage region. The program storage region may store an operating system, an application desired by at least one function (for example, a sound playing function and an image playing function), or the like. The data storage region may store data (for example, audio data and a phone book) created according to use of the computer. In addition, the memory 1320 may include a high speed random access memory, and may also include a non-volatile memory, such as at least one magnetic disk storage device, a flash memory, or another volatile solid-state storage device.

The processor 1380 is a control center of the computer, and is connected to various parts of the entire computer by using various interfaces and lines. By operating or executing a software program and/or module stored in the memory 1320, and invoking data stored in the memory 1320, various functions of the computer are executed, and data is processed. In certain embodiment(s), the processor 1380 may include one or more processing units. In certain embodiment(s), the processor 1380 may integrate an application processor and a modem. The application processor processes an operating system, a user interface, an application program, and the like. The modem processes wireless communication. It may be understood that the modem may either not be integrated into the processor 1380.

In this embodiment of the present disclosure, the processor 1380 included in the terminal device also has the following functions:

- obtaining an advertisement state corresponding to each candidate advertisement corresponding to a current exposure request, the advertisement state representing a competition condition in response to that the candidate advertisement corresponding thereto competes for the current exposure request, and obtaining an overall state of an advertising platform in response to the current exposure request, the overall state representing a current exposure task performance situation of the advertising platform;
- determining, by a classification network in a scoring model, probability of each candidate advertisement belonging to different reference advertisement types;
- determining, by a scoring network in the scoring model, a competition score of each candidate advertisement for the current exposure request according to the advertisement state corresponding to the candidate advertisement and the overall state based on the probability of the candidate advertisement belonging to different reference advertisement types, the scoring model including multiple scoring networks corresponding to different reference advertisement types; and
- determining a target advertisement exposed by the current exposure request according to the competition score of each candidate advertisement for the current exposure request.

In certain embodiment(s), the processor 1380 is further configured to perform the steps of any implementation of the data processing method according to the embodiments of the present disclosure.

Figure 14:
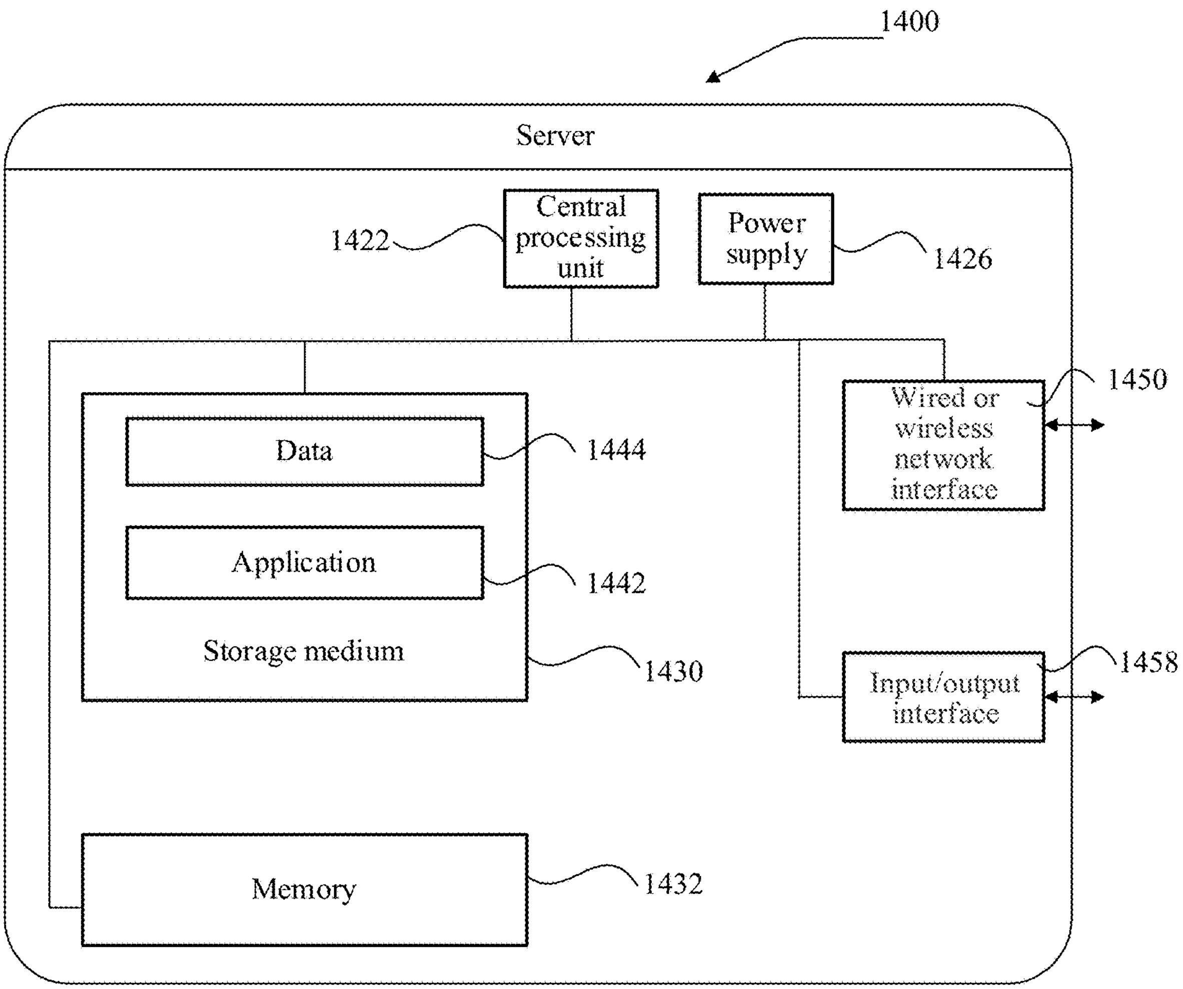
FIG. 14 is a schematic structural diagram of a server according to certain embodiment(s) of the present disclosure.

Reference is made to FIG. 14. FIG. 14 is a schematic structural diagram of a server 1400 according to an embodiment of the present disclosure. The server 1400 may greatly differ due to different configurations or performances, and may include one or more processors, for example, central processing units (CPU) 1422, a memory 1432, and one or more storage media 1430 for storing applications 1442 or data 1444 (for example, one or more mass storage devices). The memory 1432 and the storage medium 1430 may be configured for transient storage or permanent storage. A program stored in the storage medium 1430 may include one or more modules (which are not marked in the figure), and each module may include a series of instruction operations on the server. The modules, for example, may be the modules described in this disclosure. Furthermore, the central processing unit 1422 may be configured to communicate with the storage medium 1430, and perform, on the server 1400, the series of instruction operations in the storage medium 1430.

The server 1400 may further include one or more power supplies 1426, one or more wired or wireless network interfaces 1450, one or more input/output interfaces 1458, and/or one or more operating systems, for example, Windows Server™, Mac OS X™, Unix™, Linux™, FreeBSD™, and the like.

The steps performed by the server in the embodiment may be based on the server structure shown in FIG. 14.

The CPU 1422 is configured to perform the following steps:

- obtaining an advertisement state corresponding to each candidate advertisement corresponding to a current exposure request, the advertisement state representing a competition condition in response to that the candidate advertisement corresponding thereto competes for the current exposure request, and obtaining an overall state of an advertising platform in response to the current exposure request, the overall state representing a current exposure task performance situation of the advertising platform;
- determining, by a classification network in a scoring model, probability of each candidate advertisement belonging to different reference advertisement types;
- determining, by a scoring network in the scoring model, a competition score of each candidate advertisement for the current exposure request according to the advertisement state corresponding to the candidate advertisement and the overall state based on the probability of the candidate advertisement belonging to different reference advertisement types, the scoring model including multiple scoring networks corresponding to different reference advertisement types; and determining a target advertisement exposed by the current exposure request according to the competition score of each candidate advertisement for the current exposure request.

In certain embodiment(s), the CPU 1422 may be further configured to perform the steps of any implementation of the data processing method according to the embodiment of the present disclosure.

An embodiment of the present disclosure further provides a computer-readable storage medium for storing computer programs. The computer programs are configured to perform any implementation in the data processing method in the various embodiments.

An embodiment of the present disclosure also provides a computer program product. The computer program product includes computer programs or instructions. The computer programs or instructions are stored in a computer-readable storage medium. A processor of a computing device reads the computer programs or instructions from the computer-readable storage medium. The processor executes the computer programs or instructions, whereby the computing device performs any implementation in the data processing method in the various embodiments.

It will be clear to a person skilled in the art that, for convenience and brevity of description, reference may be made to the corresponding processes in the method embodiments for the specific working processes of the system, apparatus and units described herein, and details will be omitted herein.

In the several embodiments provided in the present disclosure, it is to be understood that the disclosed system, apparatus, and method may be implemented in other manners. For example, the apparatus embodiments described herein are merely examples. For example, division into the units is merely logical function division, and may be another division in an actual implementation. For example, multiple units or assemblies may be combined or may be integrated into another system, or some features may be ignored or not be performed. In addition, the displayed or discussed mutual couplings or direct couplings or communication connections may be implemented by using some interfaces. The indirect couplings or communication connections between the apparatuses or units may be electrical, mechanical, or in other forms.

The units described as separate components may or may not be physically separated, and components displayed as units may or may not be physical units, may be located in one position, or may be distributed over multiple network units. Some or all of the units may be selected based on desirables to achieve the objects of the solutions of this embodiment.

In addition, functional units in the various embodiments of the present disclosure may be integrated into one processing unit, the units may exist alone physically, or two or more units may be integrated into one unit. The integrated unit may be implemented in the form of hardware using processors or circuitry, or may be implemented in the form of a software functional unit stored in memory or non-transitory computer-readable medium that is executable by a processor.

If the integrated unit is implemented in the form of a software functional unit and sold or used as an independent product, the integrated unit may be stored in a computer-readable storage medium. Based on this understanding, the technical solution of the present disclosure, either inherently or in any part contributing to certain existing technology, or all or part of the technical solution, may be embodied in the form of a software product. The computer software product is stored in a storage medium, and includes several instructions for enabling a computing device (which may be a personal computer, a server, or a network device) to perform all or part of the steps of the method according to the various embodiments of the present disclosure. The storage medium includes: any medium capable of storing computer programs, such as a USB flash drive, a removable hard disk, a read-only memory (ROM), a random access memory (RAM), a magnetic disk, or an optical disc.

The term module (and other similar terms such as unit, subunit, submodule, etc.) in this disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or any other integrated circuit) capable of executing computer instructions or computer code. A hardware module may be implemented using processor or circuitry. Each hardware module may be implemented using one or more processors or circuitry. Likewise, a processor or circuitry may be used to implement one or more hardware modules. Moreover, each module may be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The herein-mentioned embodiments are merely illustrative of the technical solutions of the present disclosure, and are not limiting thereto. While the present disclosure has been described in detail with reference to the embodiments, a person of ordinary skill in the art will appreciate that: modifications may still be made to the technical solutions described in the embodiments, or equivalent replacements may be made to the part of the technical features. However, these modifications or replacements do not depart from the spirit and scope of the technical solutions of the various embodiments of the present disclosure in nature.

What is claimed is:

1. A data processing method, performed by a computing device, the method comprising:

training a scoring model for an advertising platform, the scoring model comprising a classification network and multiple scoring networks specialized for and having a one-to-one correspondence relationship with different reference advertisement types, wherein each of the multiple scoring networks is trained using only training candidate advertisement samples belonging to the corresponding reference advertisement type, each of the multiple scoring networks being configured to score each candidate advertisement based on the corresponding reference advertisement type of the different reference advertisement types, and wherein the classification network comprises a multilayer perceptron (MLP) layer and a Softmax layer, the classification network being configured to determine probabilities of each candidate advertisement belonging to the different reference advertisement types by splicing an advertisement state corresponding to the candidate advertisement with an overall state of the advertising platform to produce a spliced state, processing the spliced state by the MLP layer to obtain a tensor, and performing classification processing based on the tensor by the Softmax layer to output a probability vector representing the probabilities of the candidate advertisement belonging to the different reference advertisement types;

obtaining the advertisement state of each candidate advertisement of a plurality of candidate advertisements corresponding to a current exposure request, the advertisement state representing a competition condition in response to that the candidate advertisement competes for the current exposure request, and obtaining the overall state of the advertising platform in response to the current exposure request, the overall state representing a current exposure task performance situation of the advertising platform, wherein the plurality of candidate advertisements comprises a contract advertisement and a bid advertisement, the contract advertisement is associated with a contract specifying at least a predetermined playing amount, a selling price, and a targeting condition, the advertisement state of the contract advertisement includes a playing control parameter comprising a first sub-parameter that indicates a probability that the contract advertisement enters a candidate advertisement queue and a second sub-parameter used for internal sorting of contract advertisements, the second sub-parameter being a ratio of the predetermined playing amount of the contract advertisement to a current inventory amount of the contract advertisement, the bid advertisement is associated with an advertisement effect and a pre-offered bid, the contract advertisement and the bid advertisement are mixed in the plurality of candidate advertisements for the determining of the competition score;

determining, by the classification network in the scoring model, the probabilities of each candidate advertisement belonging to the different reference advertisement types;

determining, by a corresponding scoring network of the multiple scoring networks in the scoring model, a competition score of each candidate advertisement for the current exposure request according to the advertisement state corresponding to the candidate advertisement and the overall state based on the probabilities of the candidate advertisement belonging to the different reference advertisement types;

determining a target advertisement exposed by the current exposure request according to the competition score of each candidate advertisement for the current exposure request; and transmitting the target advertisement to a terminal device for playback.

2. The method according to claim 1, wherein determining the competition score of the candidate advertisement comprises:

determining an input feature of the candidate advertisement according to the advertisement state corresponding to the candidate advertisement and the overall state;

performing, based on the probabilities of the candidate advertisement belonging to the different reference advertisement types, weighted processing on the input feature of the candidate advertisement to obtain an input feature of the candidate advertisement under each reference advertisement type;

configuring, by each of the scoring networks in the scoring model, a competition score for the candidate advertisement according to the input feature of the candidate advertisement under the reference advertisement type corresponding to the scoring network; and determining a competition score of the candidate advertisement for the current exposure request through the competition scores configured for the candidate advertisement by each of the scoring networks in the scoring model.

3. The method according to claim 1, wherein determining the competition score of the candidate advertisement comprises:

determining an input feature of the candidate advertisement according to the advertisement state corresponding to the candidate advertisement and the overall state;

configuring a competition score for the candidate advertisement by each of the scoring networks in the scoring model according to the input feature of the candidate advertisement; and performing weighted summation processing on the competition score configured for the candidate advertisement by each of the scoring networks based on the probabilities of the candidate advertisement belonging to the different reference advertisement types, to obtain a competition score of the candidate advertisement for the current exposure request.

4. The method according to claim 1, wherein determining the competition score of the candidate advertisement comprises:

determining an input feature of the candidate advertisement according to the advertisement state corresponding to the candidate advertisement and the overall state;

determining a scoring network corresponding to the candidate advertisement in the scoring model based on the probabilities of the candidate advertisement belonging to the different reference advertisement types; and determining a competition score of the candidate advertisement for the current exposure request by the scoring network corresponding to the candidate advertisement according to the input feature of the candidate advertisement.

5. The method according to claim 1, wherein determining the probabilities of the candidate advertisement comprises one or more of:

determining, by the classification network, probabilities of the candidate advertisement belonging to the different reference advertisement types according to the advertisement state corresponding to the candidate advertisement and the overall state;

determining, by the classification network, probabilities of the candidate advertisement belonging to the different reference advertisement types according to the advertisement state corresponding to the candidate advertisement; and determining, by the classification network, probabilities of the candidate advertisement belonging to the different reference advertisement types according to an advertisement feature corresponding to the candidate advertisement.

6. The method according to claim 1, wherein an advertisement state corresponding to the contract advertisement comprises a competition environment in response to that the contract advertisement competes for the current exposure request, which is determined according to advertisement features of other advertisements in the plurality of candidate advertisements except the contract advertisement; the advertisement state corresponding to the contract advertisement further comprises one or more of: a playing amount, a shortage, the predetermined playing amount, the selling price, and the targeting condition of the contract advertisement; and an advertisement state corresponding to the bid advertisement comprises a competition environment in response to that the bid advertisement competes for the current exposure request, which is determined according to advertisement features of other advertisements in the plurality of candidate advertisements except the bid advertisement.

7. The method according to claim 1, wherein the scoring model is trained by: simulating a virtual advertising platform based on historical data of the advertising platform;

determining a training candidate advertisement corresponding to a training exposure request on the virtual advertising platform;

determining, by an initial scoring model to be trained, a training competition score of each training candidate advertisement for the training exposure request according to an advertisement state corresponding to the training candidate advertisement and an overall state of the virtual advertising platform, the initial scoring model comprising an initial classification network and multiple initial scoring networks corresponding to the different reference advertisement types;

determining a training target advertisement exposed by the training exposure request according to the training competition score of each training candidate advertisement for the training exposure request, and simulating a training reward generated by the virtual advertising platform exposing the training target advertisement;

determining, by a judgment model, feedback information corresponding to a current round of scoring operation of the initial scoring model according to the overall state of the virtual advertising platform after exposing the training target advertisement and the training reward, and inputting the feedback information into the initial scoring model as reference information in response to that the initial scoring model scores the training candidate advertisement corresponding to the training exposure request in a next round, so as to assist in adjusting a model parameter of the initial scoring model; and determining the initial scoring model as the scoring model in response to confirming that a training end condition is satisfied.

8. The method according to claim 7, wherein determining the training competition score of each training candidate advertisement comprises:

determining, by the initial classification network in the initial scoring model, probabilities of each training candidate advertisement belonging to the different reference advertisement types;

determining a target reference advertisement type to which the training candidate advertisement belongs according to the probabilities of the training candidate advertisement belonging to the different reference advertisement types; and determining, by an initial scoring network corresponding to the target reference advertisement type in the initial scoring model, a training competition score of the training candidate advertisement for the training exposure request according to the advertisement state corresponding to the training candidate advertisement, the overall state of the virtual advertising platform, and reference information, the reference information being feedback information provided by the judgment model for a previous round of scoring operation on the initial scoring network, and the scoring operation being performed on the training candidate advertisement corresponding to the training exposure request.

9. The method according to claim 7, wherein determining the training competition score of each training candidate advertisement comprises:

determining an input feature of each training candidate advertisement according to the advertisement state corresponding to the training candidate advertisement, the overall state of the virtual advertising platform, and reference information, the reference information being feedback information provided by the judgment model for a previous round of scoring operation on the initial scoring network, and the scoring operation being performed on the training candidate advertisement corresponding to the training exposure request;

determining, by the initial classification network in the initial scoring model, probabilities of the training candidate advertisement belonging to the different reference advertisement types;

performing, based on the probabilities of the training candidate advertisement belonging to the different reference advertisement types, weighted processing on the input feature of the training candidate advertisement to obtain an input feature of the training candidate advertisement under each reference advertisement type; and determining, by the initial scoring network in the initial scoring model, a training competition score of the training candidate advertisement for the training exposure request according to the input features of the training candidate advertisement under the different reference advertisement types.

10. The method according to claim 7, wherein simulating the virtual advertising platform comprises:

obtaining historical exposure request data, historical exposure log data, historical inventory data, and playing control parameters of historical placed advertisements of the advertising platform;

constructing the training exposure request based on the historical exposure request data and the historical exposure log data, and determining a training candidate advertisement corresponding to the training exposure request;

determining an advertisement state corresponding to the training candidate advertisement based on the historical inventory data and the playing control parameters of the historical placed advertisements; and determining an overall state of the virtual advertising platform based on the historical inventory data, the historical exposure log data, and the playing control parameters of the historical placed advertisements.

11. The method according to claim 7, wherein determining the training target advertisement comprises:

obtaining an advertisement competition score corresponding to each training candidate advertisement, the advertisement competition score being determined according to an advertisement feature of the training candidate advertisement; and determining the training target advertisement according to a training competition score of each training candidate advertisement for the training exposure request and the advertisement competition score.

12. A data processing apparatus, deployed on a computing device, the apparatus comprising: a memory storing computer program instructions; and a processor coupled to the memory and configured to execute the computer program instructions and perform:

training a scoring model for an advertising platform, the scoring model comprising a classification network and multiple scoring networks specialized for and having a one-to-one correspondence relationship with different reference advertisement types, wherein each of the multiple scoring networks is trained using only training candidate advertisement samples belonging to the corresponding reference advertisement type, each of the multiple scoring networks being configured to score each candidate advertisement based on the corresponding reference advertisement type of the different reference advertisement types, and wherein the classification network comprises a multilayer perceptron (MLP) layer and a Softmax layer, the classification network being configured to determine probabilities of each candidate advertisement belonging to the different reference advertisement types by splicing an advertisement state corresponding to the candidate advertisement with an overall state of the advertising platform to produce a spliced state, processing the spliced state by the MLP layer to obtain a tensor, and performing classification processing based on the tensor by the Softmax layer to output a probability vector representing the probabilities of the candidate advertisement belonging to the different reference advertisement types;

obtaining the advertisement state of each candidate advertisement of a plurality of candidate advertisements corresponding to a current exposure request, the advertisement state representing a competition condition in response to that the candidate advertisement competes for the current exposure request, and obtaining the overall state of the advertising platform in response to the current exposure request, the overall state representing a current exposure task performance situation of the advertising platform, wherein the plurality of candidate advertisements comprises a contract advertisement and a bid advertisement, the contract advertisement is associated with a contract specifying at least a predetermined playing amount, a selling price, and a targeting condition, the advertisement state of the contract advertisement includes a playing control parameter comprising a first sub-parameter that indicates a probability that the contract advertisement enters a candidate advertisement queue and a second sub-parameter used for internal sorting of contract advertisements, the second sub-parameter being a ratio of the predetermined playing amount of the contract advertisement to a current inventory amount of the contract advertisement, the bid advertisement is associated with an advertisement effect and a pre-offered bid, the contract advertisement and the bid advertisement are mixed in the plurality of candidate advertisements for the determining of the competition score;

determining, by the classification network in the scoring model, the probabilities of each candidate advertisement belonging to the different reference advertisement types;

determining, by a corresponding scoring network of the multiple scoring networks in the scoring model, a competition score of each candidate advertisement for the current exposure request according to the advertisement state corresponding to the candidate advertisement and the overall state based on the probabilities of the candidate advertisement belonging to the different reference advertisement types;

determining a target advertisement exposed by the current exposure request according to the competition score of each candidate advertisement for the current exposure request; and transmitting the target advertisement to a terminal device for playback.

13. The data processing apparatus according to claim 12, determining the competition score of the candidate advertisement includes:

determining an input feature of the candidate advertisement according to the advertisement state corresponding to the candidate advertisement and the overall state;

performing, based on the probabilities of the candidate advertisement belonging to the different reference advertisement types, weighted processing on the input feature of the candidate advertisement to obtain an input feature of the candidate advertisement under each reference advertisement type;

configuring, by each of the scoring networks in the scoring model, a competition score for the candidate advertisement according to the input feature of the candidate advertisement under the reference advertisement type corresponding to the scoring network; and determining a competition score of the candidate advertisement for the current exposure request through the competition scores configured for the candidate advertisement by each of the scoring networks in the scoring model.

14. The data processing apparatus according to claim 12, determining the competition score of the candidate advertisement includes:

determining an input feature of the candidate advertisement according to the advertisement state corresponding to the candidate advertisement and the overall state;

configuring a competition score for the candidate advertisement by each of the scoring networks in the scoring model according to the input feature of the candidate advertisement; and performing weighted summation processing on the competition score configured for the candidate advertisement by each of the scoring networks based on the probabilities of the candidate advertisement belonging to the different reference advertisement types, to obtain a competition score of the candidate advertisement for the current exposure request.

15. The data processing apparatus according to claim 12, wherein determining the competition score of the candidate advertisement includes:

determining an input feature of the candidate advertisement according to the advertisement state corresponding to the candidate advertisement and the overall state;

determining a scoring network corresponding to the candidate advertisement in the scoring model based on the probabilities of the candidate advertisement belonging to the different reference advertisement types; and determining a competition score of the candidate advertisement for the current exposure request by the scoring network corresponding to the candidate advertisement according to the input feature of the candidate advertisement.

16. The data processing apparatus according to claim 12, wherein determining the probabilities of the candidate advertisement includes one or more of:

determining, by the classification network, probabilities of the candidate advertisement belonging to the different reference advertisement types according to the advertisement state corresponding to the candidate advertisement and the overall state;

determining, by the classification network, probabilities of the candidate advertisement belonging to the different reference advertisement types according to the advertisement state corresponding to the candidate advertisement; and determining, by the classification network, probabilities of the candidate advertisement belonging to the different reference advertisement types according to an advertisement feature corresponding to the candidate advertisement.

17. The data processing apparatus according to claim 12, wherein an advertisement state corresponding to the contract advertisement comprises a competition environment in response to that the contract advertisement competes for the current exposure request, which is determined according to advertisement features of other advertisements in the plurality of candidate advertisements except the contract advertisement; the advertisement state corresponding to the contract advertisement further comprises one or more of: a playing amount, a shortage, the predetermined playing amount, the selling price, and the targeting condition of the contract advertisement; and an advertisement state corresponding to the bid advertisement comprises a competition environment in response to that the bid advertisement competes for the current exposure request, which is determined according to advertisement features of other advertisements in the plurality of candidate advertisements except the bid advertisement.

18. The data processing apparatus according to claim 12, wherein the scoring model is trained by:

simulating a virtual advertising platform based on historical data of the advertising platform;

determining a training candidate advertisement corresponding to a training exposure request on the virtual advertising platform;

determining, by an initial scoring model to be trained, a training competition score of each training candidate advertisement for the training exposure request according to an advertisement state corresponding to the training candidate advertisement and an overall state of the virtual advertising platform, the initial scoring model comprising an initial classification network and multiple initial scoring networks corresponding to the different reference advertisement types;

determining a training target advertisement exposed by the training exposure request according to the training competition score of each training candidate advertisement for the training exposure request, and simulating a training reward generated by the virtual advertising platform exposing the training target advertisement;

determining, by a judgment model, feedback information corresponding to a current round of scoring operation of the initial scoring model according to the overall state of the virtual advertising platform after exposing the training target advertisement and the training reward, and inputting the feedback information into the initial scoring model as reference information in response to that the initial scoring model scores the training candidate advertisement corresponding to the training exposure request in a next round, so as to assist in adjusting a model parameter of the initial scoring model; and determining the initial scoring model as the scoring model in response to confirming that a training end condition is satisfied.

19. A non-transitory computer-readable storage medium storing computer program instructions executable by at least one processor to perform:

training a scoring model for an advertising platform, the scoring model comprising a classification network and multiple scoring networks specialized for and having a one-to-one correspondence relationship with different reference advertisement types, wherein each of the multiple scoring networks is trained using only training candidate advertisement samples belonging to the corresponding reference advertisement type, each of the multiple scoring networks being configured to score each candidate advertisement based on the corresponding reference advertisement type of the different reference advertisement types, and wherein the classification network comprises a multilayer perceptron (MLP) layer and a Softmax layer, the classification network being configured to determine probabilities of each candidate advertisement belonging to the different reference advertisement types by splicing an advertisement state corresponding to the candidate advertisement with an overall state of the advertising platform to produce a spliced state, processing the spliced state by the MLP layer to obtain a tensor, and performing classification processing based on the tensor by the Softmax layer to output a probability vector representing the probabilities of the candidate advertisement belonging to the different reference advertisement types;

obtaining the advertisement state of each candidate advertisement of a plurality of candidate advertisements corresponding to a current exposure request, the advertisement state representing a competition condition in response to that the candidate advertisement competes for the current exposure request, and obtaining the overall state of the advertising platform in response to the current exposure request, the overall state representing a current exposure task performance situation of the advertising platform, wherein the plurality of candidate advertisements comprises a contract advertisement and a bid advertisement, the contract advertisement is associated with a contract specifying at least a predetermined playing amount, a selling price, and a targeting condition, the advertisement state of the contract advertisement includes a playing control parameter comprising a first sub-parameter that indicates a probability that the contract advertisement enters a candidate advertisement queue and a second sub-parameter used for internal sorting of contract advertisements, the second sub-parameter being a ratio of the predetermined playing amount of the contract advertisement to a current inventory amount of the contract advertisement, the bid advertisement is associated with an advertisement effect and a pre-offered bid, the contract advertisement and the bid advertisement are mixed in the plurality of candidate advertisements for the determining of the competition score;

determining, by the classification network in the scoring model, the probabilities of each candidate advertisement belonging to the different reference advertisement types;

determining, by a corresponding scoring network of the multiple scoring networks in the scoring model, a competition score of each candidate advertisement for the current exposure request according to the advertisement state corresponding to the candidate advertisement and the overall state based on the probabilities of the candidate advertisement belonging to the different reference advertisement types;

determining a target advertisement exposed by the current exposure request according to the competition score of each candidate advertisement for the current exposure request; and transmitting the target advertisement to a terminal device for playback.

20. The method according to claim 1, wherein when the candidate advertisement is the contract advertisement, the input feature of the candidate advertisement includes at least a playing amount shortage.

* * * * *